US012791679B1

(12) United States Patent
Angus et al.

(10) Patent No.: US 12,791,679 B1

(45) Date of Patent: Nov. 10, 2026

(54) SCANNER FOR A LIDAR SYSTEM

(71) Applicant: Aurora Operations, Inc., Pittsburgh, PA (US)

(72) Inventors: Edward Joseph Angus, Bozeman, MT (US); Christoffer James Renner, Bozeman, MT (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 19/421,677

(22) Filed: Dec. 16, 2025

(51) Int. Cl.

| | |
|---|---|
| ***G01C 3/08*** | (2006.01) |
| ***B60W 60/00*** | (2020.01) |
| ***G01S 7/481*** | (2006.01) |
| ***G01S 17/931*** | (2020.01) |
| ***G02B 26/10*** | (2006.01) |

(52) U.S. Cl.

CPC ....... *G01S 7/4817* (2013.01); *B60W 60/0015* (2020.02); *G01S 7/4813* (2013.01); *G01S 17/931* (2020.01); *G02B 26/105* (2013.01)

(58) Field of Classification Search

CPC .... G01S 7/4817; G01S 7/4813; G01S 17/931; B60W 60/0015; G02B 26/105

See application file for complete search history.

(56) References Cited

U.S. PATENT DOCUMENTS

| | | | | |
|---|---|---|---|---|
| 2019/0179028 | A1* | 6/2019 | Pacala | B60L 3/0015 |
| 2020/0116836 | A1* | 4/2020 | Pacala | G01J 1/4204 |
| 2020/0218062 | A1* | 7/2020 | Hall | G01S 17/06 |
| 2023/0006531 | A1* | 1/2023 | Pomerantz | G01S 7/4817 |
| 2024/0142580 | A1* | 5/2024 | Pomerantz | H02K 7/02 |
| 2024/0264290 | A1* | 8/2024 | Payne | G01S 17/32 |
| 2025/0110328 | A1* | 4/2025 | Huang | G02B 26/0833 |
| 2025/0355094 | A1* | 11/2025 | Joy | G01S 7/4865 |

FOREIGN PATENT DOCUMENTS

| | | | | |
|---|---|---|---|---|
| WO | WO-2019113368 | A1 * | 6/2019 | G01S 17/931 |

OTHER PUBLICATIONS

Pei et al. "A Novel Family of Leaf-Type Compliant Joints: Combination of Two Isosceles-Trapezoidal Flexural Pivots." (Jan. 7, 2009) Journal of Mechanisms and Robotics, vol. 1., May 2009. 021005-1-021005-6. https://doi.org/10.1115/1.3046140. 6 pgs.

Wikipedia, "Fatigue Limit", (N.D.), https://en.wikipedia.org/wiki/Fatigue_limit, retrieved on Sep. 12, 2025, 7 pgs.

* cited by examiner

*Primary Examiner* — Samantha K Nickerson

(74) *Attorney, Agent, or Firm* — Dority & Manning, P.A.

(57) ABSTRACT

A light detection and ranging (LIDAR) system for a vehicle includes a light source configured to emit light and a scanner configured to direct the light to an environment of the vehicle. The scanner includes: a rigid body comprising one or more drive coils, a rotatable body comprising one or more magnets, the rotatable body connected to the rigid body via a connection body and a first flexure stage and a second flexure stage, wherein the first flexure stage and the second flexure stage are configured to oscillate in response to a force exerted on the one or more magnets when the one or more drive coils are driven, thereby causing the rotatable body to rotate, and a scan element configured to rotate via rotation of the rotatable body and to direct the light emitted by the light source to the environment of the vehicle.

20 Claims, 10 Drawing Sheets

3200

3400

SCANNER FOR A LIDAR SYSTEM

BACKGROUND

Light Detection and Ranging (LIDAR) systems use lasers to create three-dimensional representations of surrounding environments. A LIDAR system includes at least one emitter paired with a receiver to form a channel, though an array of channels may be used to expand the field of view of the LIDAR system. During operation, each channel emits a laser beam into the environment. The laser beam reflects off of an object within the surrounding environment, and the reflected laser beam is detected by the receiver. A single channel provides a single point of ranging information. Collectively, channels are combined to create a point cloud that corresponds to a three-dimensional representation of the surrounding environment.

The emitter and/or receiver often includes photonic circuitry formed on a semiconductor substrate such as a silicon die. Silicon photonics dies can provide for precise formation of the photonic circuitry through, for example, photolithography. Other optical components of a LIDAR system may also be formed on semiconductor substrates, while still others are formed on or connected to components made using other semiconductor materials such as, for example, a group III-V semiconductor, gallium arsenide (GaAs), and/or other suitable materials.

SUMMARY

Aspects and advantages of implementations of the disclosure will be set forth in part in the following description, or may be learned from the description, or may be learned through practice of the implementations.

Example aspects of the disclosure relate to a scanner for a LIDAR system. Resonant scanners are electro-opto-mechanical devices that use the concept of mechanical resonance to achieve large scanning angles while maintaining low power consumption. This allows for very large mirrors to be scanned in a repeatable motion without the need for large drive electronics or active cooling. Although they have moving parts, they do not have wearing parts (e.g., no kinetic friction) meaning that a properly designed resonant scanner can last indefinitely.

Described herein are systems and methods associated with a scanner for a LIDAR system. For example, described herein is a resonant scanner having a metal sub-structure configured to rotate a mirror, where the metal sub-structure does not have any wearing parts and is highly durable. The metal sub-structure includes a first flexure stage having a first plurality of flexure components, with respective flexure components of the first plurality of flexure components including a plurality of spring components (e.g., leaf-springs) which are configured to be driven (excited) at their natural resonant frequency which causes a rotatable body coupled to a mirror to be rotated. The metal sub-structure further includes a second flexure stage having a second plurality of flexure components, with respective flexure components of the second plurality of flexure components including at least one spring component (e.g., leaf-spring) which is configured to be driven (excited) at its natural resonant frequency which causes the rotatable body coupled to the mirror to be rotated. The second flexure stage can be disposed between spring components of the first plurality of flexure components in an axial direction of the resonant scanner. The mirror can be rotated over a large range (e.g., +/−30 degrees of scan angle) and has a large field of view (e.g., about 120 degrees) while consuming a low amount of power (e.g., less than ten watts, less than five watts, etc.). Further, performance of the resonant scanner remains stable in adverse environments. For example, performance of the resonant scanner remains stable in high vibration, high impact, high acceleration environments, over a wide range of temperatures. This can be particularly advantageous for LIDAR systems operating in vehicle applications such as for autonomous vehicle control.

The resonant scanner according to examples of the disclosure includes flexure stages having flexure components with a high-deflection compound beam geometry. The metal sub-structure can be coupled to a rigid body and a rotatable body in a manner that allows for installing drive and sense electronics in a compact manner. The spring components are formed of metal plates and are treated with materials having a high deflection performance. The mirror can be coupled to the rotatable body such that the mirror has collision-free high deflection angles and rotates about an axis which is offset from a center of mass of the mirror.

Existing LIDAR systems include LIDAR systems having micro electromechanical machines (MEMS) components which are formed of silicon (e.g., silicon crystals). However, utilizing MEMS components constrains the size of the mirror (e.g., to about 15 millimeters) and performance can be susceptible to and degraded by vibrations. Existing LIDAR systems also include LIDAR systems having polygon scanners, however the polygon scanners may have a limited field of view and utilize motor and/or gear mechanisms to rotate the polygon mirror which are susceptible to wear and failure over time. Further, to obtain a larger field of view for a polygon scanner, the size of the polygon scanner may be increased, increasing the space needed to accommodate the polygon scanner.

Examples of the disclosure are directed to a LIDAR system including a resonant scanner configured to direct light emitted from a light source of a LIDAR engine to an environment of a vehicle. The resonant scanner may include a structural component and a scan element (mirror) coupled to the structural component. The structural component may include a fixed or stationary portion (rigid body) and a rotatable portion (rotatable body).

In an example embodiment, the rigid body can include one or more coils (e.g., voice coils, air coils, drive coils, etc. filled with air or a higher magnetic flux material), an encoder (e.g., a quadrature encoder), one or more controllers (e.g., microcontrollers), and one or more drive circuits (e.g., H-bridge circuits). The rotatable body can include an encoder strip and one or more magnets (e.g., permanent magnets, permanent arc magnets, etc.) which are disposed to face the one or more coils. The scanner can also include a first flexure stage coupled to the rigid body at a first end and a connection body at a second end, and a second flexure stage coupled to the rotatable body at a first end and the connection body at a second end. The scan element (e.g., a mirror) may be mounted to the rotatable body and rotate about an axis of rotation (a virtual axis) which is offset from the center of mass of the scan element.

The one or more coils may be mounted on a first side of the rigid body and be wound about an axis which is transverse to an axis of rotation of the scan element as well as an axis of rotation of the rotatable body. For example, when a current is applied to the one or more coils, the flux direction is transverse to the axis of rotation of the scan element and the axis of rotation of the rotatable body. The magnetic field generated by the one or more coils interacts with the magnetic field of the one or more magnets, and a force (a torque) is exerted on the one or more magnets which can cause the rotatable body—to which the one or more magnets are mounted—to rotate. Flexure components of the first flexure stage and the second flexure stage are configured to oscillate in response to the torque (rotational force) that is applied to the rotatable body including the one or more magnets.

An example configuration of the first flexure stage may be as follows. For example, the first flexure stage can include a first plurality of flexure components which extend outward radially from the rigid body to the connection body. For example, the first plurality of flexure components include a first flexure component with a first plurality of spring components (e.g., a first spring component and a second spring component), and a second flexure component with a second plurality of spring components (e.g., a third spring component and a fourth spring component). The flexure components may be formed of a material that can be excited at its fundamental (resonant) frequency. The flexure components may include a plurality of leaf-type isosceles-trapezoidal flexure components. The flexure components may be disposed in parallel which can allow for extremely large deflections without high stresses to occur, enabling scanned fields of view larger than 100 degrees to be achieved. Additionally, the flexure components are very stiff in out of plane motion. A flexure component may include a plurality of spring components that are disposed between and coupled to the rotatable body and the connection body. For example, a spring component may be disposed in a groove provided in the rigid body and/or the connection body. For example, the spring component may be welded to the rigid body and/or the connection body. Spring components of a first flexure component may be spaced apart in a circumferential direction of the rotatable body from spring components of a second flexure component. The spring components may be thin flat metal plates formed of steel, for example, stainless steel (e.g., precipitation stainless steel), and may include one or more interstitial additives (e.g., copper, aluminum, etc.) that enhance the durability and/or strength of the spring component. For example, the connection body and the rigid body may be formed of stainless steel (e.g., 410 stainless steel having a magnetic martensitic structure).

An example configuration of the second flexure stage may be as follows. For example, the second flexure stage can include a second plurality of flexure components which extend outward radially from the rotatable body to the connection body. For example, the second plurality of flexure components of the second flexure stage can include a first flexure component with a first spring component and a second flexure component with a second spring component.

The flexure components and the spring components of the second flexure stage may be similar in composition and function as the flexure components and spring components of the first flexure stage. For example, a spring component of the second flexure stage may be disposed in a groove provided in the rotatable body and/or the connection body. For example, the spring component of the second flexure stage may be welded to the rotatable body and/or the connection body. The first spring component of the first flexure component of the second flexure stage may be spaced apart in a circumferential direction of the rotatable body from the second spring component of the second flexure component of the second flexure stage.

To achieve a compact resonant structure, in some implementations, various components may be disposed within radial and/or axial lengths of the flexure components of the first and second flexure stages. For example, the one or more coils and/or the one or more magnets may be disposed in a space between the rotatable body and the rigid body. For example, the one or more coils and the encoder may be disposed on the rigid body at a position that is outside of the first and second flexure stages (e.g., spaced apart from the first and second flexure stages in a circumferential direction of the rotatable body). For example, the one or more magnets may be disposed on the rotatable body at a position that is outside of the first and second flexure stages (e.g., spaced apart from the first and second flexure stages in a circumferential direction of the rotatable body). The one or more coils may be spaced apart from the one or more magnets in a direction transverse to an axis of rotation of the rotatable body.

The encoder (e.g., a quadrature encoder) may be disposed on the rigid body and be configured to measure at least one of a position of the rotatable body and a direction of movement of the rotatable body. For example, the encoder can include one or more encoder readers (one or more detectors or sensors such as an optical sensor) which may be disposed on the rigid body and which are configured to detect markings that are provided on a part (e.g., an encoder strip such as a reflective adhesive strip) disposed on the rotatable body. In some implementations, the encoder is configured to determine the position information based on a number of pulses or square waves generated and/or by counting transitions in reflected light intensity from the reflective adhesive strip. In some implementations, the encoder may include a quadrature encoder having a plurality of encoder readers (detectors or sensors such as optical sensors) which output two signals (corresponding to an "A" channel and a "B" channel), such as square waves. For example, the A channel and B channel may be 90 degrees out of phase. The encoder may be configured to determine a direction of rotation of the rotatable body based on an alternating pattern of the A channel and B channel. Further, in some implementations the encoder can include an index track (corresponding to a "C" channel). The index track can be implemented to indicate a direction of rotation via an absolute state change (e.g., a 2-bit state change), and provide a reference point for absolute position information. The encoder may be configured to output a first signal indicating at least one of position information or direction information associated with the rotation of the rotatable body when the one or more coils are driven.

In some implementations, the scanner can further include a controller (e.g., a microcontroller) configured to control a supply of power or current to drive the one or more coils. For example, the one or more controllers may be configured to control one or more power sources of the LIDAR system to supply power to the one or more coils to drive the one or more coils which causes the force (torque) to be exerted on the one or more magnets, thereby causing the first flexure stage and the second flexure stage to oscillate. Based on information provided by the encoder, the controller can be configured to control the power (e.g., the current) supplied to the one or more coils to ensure a phase lock between frequencies of the one or more coils and the rotation of the rotatable body so that the rotatable body (and correspondingly the scan element) rotates at the resonate frequency of the flexure components of the first and second flexure stages.

In some implementations, the LIDAR system may include a driving circuit which is configured to provide a driving signal to the one or more coils. For example, the driving circuit may include a H-bridge circuit that is configured to repeatedly reverse a polarity of the voltage or reverse a direction of the current applied to the one or more coils, thereby exerting a force (torque) in alternating directions with respect to the one or more magnets.

The scan element may be configured to rotate via rotation of the rotatable body and to direct the light emitted by the light source to an environment of the vehicle. The scan element can include a mirror having a variable field of view, where the field of view can be adjusted according to a magnitude of a supply of current supplied to drive the one or more coils. In some implementations, the variable field of view can range from between about 0 degrees and about 150 degrees. In some implementations, the mirror can be displaced between about 45 degrees and about 75 degrees, or more particularly about 60 degrees (e.g., +/−30 degrees from a center position). In some implementations, the mirror has a reflective surface area of between about five square inches and about ten square inches, or more particularly between about two square inches and about ten square inches.

Examples of the disclosure are also directed to a drive control system for a scanner of a LIDAR system. For example, the one or more controllers may form part of a drive control system and may be configured to provide one or more control signals to one or more power sources and/or the drive circuit to drive the one or more coils. When the one or more coils are driven (e.g., when a current is applied to the one or more coils), the magnetic field generated by the one or more coils interacts with the magnetic field of the one or more magnets, and a force (e.g., a torque) is exerted on the one or more magnets which can disposed at the rotatable body. Further, the flexure components of the first and second flexure stages are configured to oscillate in response to the torque that is applied to the rotatable body including the one or more magnets. For example, the flexure components (and their respective spring components) may be formed of a material that can be excited at its fundamental (resonant) frequency.

The LIDAR system may include one or more power sources to supply power to the one or more coils via a drive circuit. In some implementations, the one or one or more controllers are configured to control the one or more power sources to supply the power to drive the one or more coils (via the drive circuit), by providing an input associated with driving the one or more coils and adjusting the input based on one or more first signals output by the encoder and a second signal associated with the input. For example, the supply of power can be controlled by switching and/or regulating voltage and/or current to control at least one of timing, direction, and magnitude of the voltage and/or current applied to the one or more coils. In some implementations, the drive circuit may be embodied as one or more transistors, a half-bridge circuit, or a H-bridge circuit. The H-bridge circuit allows full bidirectional control of current through the one or more coils (e.g., in a first rotational direction and a second rotational direction). In some implementations, the H-bridge circuit can include a snubber circuit (e.g., a triple snubber filter) to dampen voltage transients, suppress ringing or oscillations, improve switching performance, etc. The drive circuit can be configured to supply voltage to cause displacement of the scan element to be about 60 degrees (e.g., +/−30 degrees), the supplied voltage being about 10 volts, or more particularly about 7 volts. The drive circuit can be configured to supply power to cause displacement of the scan element to be about 60 degrees (e.g., +/−30 degrees), the supplied power being less than 10 watts, or more particularly less than 5 watts. In some implementations, the one or more controllers may be configured to control the one or more power sources to vary the power (e.g., current and/or voltage) supplied to drive the one or more coils via the drive circuit to vary a field of view of the scan element between about 0 degrees and about 150 degrees.

In some implementations, the one or more controllers are configured to control the drive circuit (e.g., an H-bridge circuit) to output the second signal, and the second signal includes two opposite-phase square wave signals to alternate a direction of current applied to the one or more coils. In some implementations, the one or more controllers are configured to control the drive circuit to output the second signal, and the second signal includes a sine wave signal having a first frequency which is generated using pulse-width modulation having a second frequency (e.g., the first frequency being greater than the second frequency).

According to examples of the disclosure, the first signal output by the encoder represents or is indicative of the movement (rotation) of the rotatable body which is coupled with the scan element. That is, the first signal output by the encoder can be used by the one or more controllers to reconstruct a waveform that corresponds to how the rotatable body rotates (e.g., a direction of rotation, position information, speed information, etc.). The one or more controllers may be configured to compare a phase of the first signal and/or reconstructed waveform relative to a phase of the second signal and the one or more controllers may be configured to adjust an input provided to drive the one or more coils based on the first signal output by the encoder (or the reconstructed waveform) and the second signal so that the rotatable body (and correspondingly the scan element), oscillates at the resonant frequency of the flexure components of the first and second flexure stages. For example, the one or more controllers may be configured to adjust an input which can include a phase difference between the first signal or reconstructed waveform and the second signal. For example, the one or more controllers may be configured to provide a control input to drive the one or more coils such that the first signal (or reconstructed waveform) is out of phase with the second signal by 90 degrees, so that the rotatable body (and correspondingly the scan element), oscillates at the resonant frequency of the flexure components of the first and second flexure stages.

In some implementations, the one or more controllers are configured to adjust one or more other inputs (e.g., a frequency associated with the second signal, an amount of power associated with the second signal, etc.), based on the first signal (or the reconstructed waveform) and the second signal associated with the input. For example, the one or more controllers may be configured to, based on differences between the first signal output by the encoder and the second signal, adjust the amount of power so that pulses associated with the first signal are centered with a natural oscillation frequency associated with the flexure components of the first and second flexure stages.

Example aspects of the disclosure are directed to LIDAR systems for autonomous vehicles. As further described herein, the LIDAR systems can be used by various devices and platforms (e.g., robotic platforms, etc.) to improve the ability of the devices and platforms to perceive their environment and perform functions in response thereto (e.g., autonomously navigating through the environment).

An autonomous vehicle (AV) can include a LIDAR system to assist the AV in perceiving its environment and navigating its environment. The LIDAR system can include a transceiver having a transmitter and receiver. The transmitter can condition a light beam (e.g., a laser beam) to be emitted by the LIDAR system into its environment. Similarly, the receiver can provide for receiving the light beam after it is emitted into the environment of the LIDAR system and reflected by objects in the environment. The receiver can provide the received beam to downstream components of the LIDAR system for processing, which can provide for the AV to perceive its environment. Because of the correlation between the transmitted beam and received beam, the transmitter and receiver may generally be placed in a tightly controlled positional relationship. For instance, the portion of the transmitter that emits the beam can be positioned near the portion of the receiver that receives the beam. In addition, some LIDAR systems such as coherent LIDAR systems can utilize a reference signal, such as a local oscillator (LO) signal, which passes from the transmitter to receiver without being emitted into the environment of the LIDAR system. For instance, this reference signal may be combined with the received beam to denoise or otherwise process the received beam to extract useful information. For instance, the LIDAR system can determine a distance to the object and/or velocity of the object based on the reflected beam.

The disclosure provides an improved LIDAR system, such as a coherent LIDAR system or a time-of-flight (ToF) LIDAR system, which includes components such as scanners which are durable, have an increased field of view, and are compact in size.

A scanner for a LIDAR system according to the disclosure can provide numerous technical effects and benefits. For example, the disclosed resonant scanners for the LIDAR systems described herein do not include wearing parts and thus are highly durable and reliable and have a long life cycle. The disclosed resonant scanners described herein can also have a compact size, with various components disposed in an inner space between the rotatable body and the rigid body. Further, according to the resonant scanners described herein in which the scan element rotates about an axis that is different from an axis associated with the center of mass of the scan element, the size of the scan element can be larger compared to scan elements of previous LIDAR systems. For example, according to the configurations of the resonant scanner described herein, the deflection of the scan element is not limited by obstructions such as a static structure, and can be deflected to the extent that the physical structure of flexure components allows (e.g., based on material endurance and stress characteristics).

The configuration of the scanner in which the scan element rotates about an axis which is offset from the center of mass of the scan element further allows the scan element to be positioned closer to a LIDAR enclosure window of the LIDAR system through which light is transmitted and received. Further, the configuration of the scanner in which the scan element rotates about an axis which is offset from the center of mass of the scan element allows for a smaller sized LIDAR enclosure window while being performant over a field of view of at least 120 degrees. Therefore, a vehicle can use less LIDARs overall to obtain full (360-degree) coverage compared to existing systems. In addition, the LIDAR enclosure window may be formed with a flat or flatter shape compared to existing LIDAR systems which have cylindrically-shaped windows. The flatter LIDAR enclosure window can thus be maintained (cleaned) more easily, can be heated, and can be integrated with other vehicle components (e.g., wipers) more easily compared to cylindrically-shaped windows.

The disclosed driving controls for a resonant scanner of a LIDAR system described herein are capable of varying a field-of-view of a scan element on-the-fly and consume low amounts of power (e.g., less than 10 watts, less than 5 watts, etc.). Further, the disclosed driving controls can ensure that the scan element oscillates at the resonant frequency of the flexure components based on information output by the encoder and potentially other feedback control loop mechanisms.

Example aspects of the disclosure provide an example light detection and ranging (LIDAR) system for a vehicle. The example LIDAR system includes: a light source configured to emit light; and a scanner configured to direct the light to an environment of the vehicle, the scanner including: a rigid body including one or more drive coils, a rotatable body including one or more magnets, the rotatable body connected to the rigid body via a connection body and a first flexure stage and a second flexure stage, wherein the first flexure stage and the second flexure stage are configured to oscillate in response to a force exerted on the one or more magnets when the one or more drive coils are driven, thereby causing the rotatable body to rotate, and a scan element configured to rotate via rotation of the rotatable body and to direct the light emitted by the light source to the environment of the vehicle.

In some implementations, the LIDAR system further includes one or more power sources; and one or more controllers configured to control the one or more power sources to supply power to the one or more drive coils to drive the one or more drive coils which causes the force to be exerted on the one or more magnets, thereby causing flexure components of the first flexure stage and the second flexure stage to oscillate.

In some implementations, the one or more drive coils are wound about an axis which is transverse to an axis of rotation of the scan element.

In some implementations, the second flexure stage is coupled to the rotatable body and the connection body.

In some implementations, the first flexure stage is coupled to the rigid body and the connection body.

In some implementations, at least a portion of the first flexure stage and at least a portion of the second flexure stage lie in a same plane, the same plane being parallel to an axis of rotation of the scan element.

In some implementations, the first flexure stage includes a first flexure component including a first spring component and a second spring component and a second flexure component including a third spring component and a fourth spring component, the first spring component and the second spring component lie in a first plane and the third spring component and the fourth spring component lie in a second plane.

In some implementations, the second flexure stage includes a first flexure component and a second flexure component, the first flexure component of the second flexure stage is disposed between the first spring component and the second spring component of the first flexure stage in the first plane, and the second flexure component of the second flexure stage is disposed between the third spring component and the fourth spring component of the first flexure stage in the second plane.

In some implementations, the first spring component and the second spring component are spaced apart in an axial direction of the rotatable body.

In some implementations, the first flexure stage and the second flexure stage are formed of steel plates.

In some implementations, the first flexure stage includes a first flexure component and a second flexure component each having a radial length which extends in a radial direction of the rotatable body from the rigid body to the connection body and are spaced apart from each other in a circumferential direction of the rotatable body, the first flexure component includes a first plurality of spring components spaced apart from each other in an axial direction of the rotatable body, and the second flexure component includes a second plurality of spring components spaced apart from each other in the axial direction of the rotatable body.

In some implementations, the scan element is coupled to the rotatable body.

In some implementations, an axis of rotation of the scan element is offset from a center of mass of the scan element.

In some implementations, the scanner further includes an encoder configured to measure at least one of a position of the rotatable body and a direction of movement of the rotatable body, the encoder being disposed between the rotatable body and the rigid body.

In some implementations, the scan element is a mirror configured to be displaced according to a magnitude of a supply of current supplied to drive the one or more drive coils to provide a variable field of view for the LIDAR system.

In some implementations, the LIDAR system further includes one or more controllers configured to control the supply of current supplied to drive the one or more drive coils such that the scan element is displaceable between about 45 degrees and about 75 degrees.

In some implementations, the variable field of view is adjustable between about 0 degrees and about 120 degrees.

In some implementations, the one or more drive coils and the one or more magnets are disposed in a space between the rotatable body and the rigid body, and are spaced apart from the first flexure stage in a circumferential direction of the rotatable body.

Example aspects of the disclosure provide an example autonomous vehicle (AV) control system for a vehicle. The example AV control system for the vehicle includes one or more processors and a Light Detection and Ranging (LIDAR) system including: a light source configured to emit light; and a scanner configured to direct the light to an environment of the vehicle, the scanner including: a rigid body including one or more drive coils, a rotatable body including one or more magnets, the rotatable body connected to the rigid body via a connection body and a first flexure stage and a second flexure stage, wherein the first flexure stage and the second flexure stage are configured to oscillate in response to a force exerted on the one or more magnets when the one or more drive coils are driven, thereby causing the rotatable body to rotate, and a scan element configured to rotate via rotation of the rotatable body and to direct the light emitted by the light source to the environment of the vehicle.

Example aspects of the disclosure provide an example autonomous vehicle (AV). The example AV includes an autonomous vehicle control system, the autonomous vehicle control system including one or more processors and a light detection and ranging (LIDAR) system, the LIDAR system including: a light source configured to emit light; and a scanner configured to direct the light to an environment of the autonomous vehicle, the scanner including: a rigid body including one or more drive coils, a rotatable body including one or more magnets, the rotatable body connected to the rigid body via a connection body and a first flexure stage and a second flexure stage, wherein the first flexure stage and the second flexure stage are configured to oscillate in response to a force exerted on the one or more magnets when the one or more drive coils are driven, thereby causing the rotatable body to rotate, and a scan element configured to rotate via rotation of the rotatable body and to direct the light emitted by the light source to the environment of the autonomous vehicle.

Other example aspects of the disclosure are directed to other systems, methods, vehicles, apparatuses, tangible non-transitory computer-readable media, and devices for motion prediction and/or operation of a device including a LIDAR system having a LIDAR module according to example aspects of the disclosure.

These and other features, aspects and advantages of various implementations of the disclosure will become better understood with reference to the following description and appended claims. The accompanying drawings, which are incorporated in and constitute a part of this specification, illustrate implementations of the disclosure and, together with the description, serve to explain the related principles.

DETAILED DESCRIPTION

The following describes the technology of this disclosure within the context of a LIDAR system and an autonomous vehicle for example purposes only. As described herein, the technology is not limited to an autonomous vehicle and can be implemented within other robotic and computing systems as well as various devices. For example, the systems and methods disclosed herein can be implemented in a variety of ways including, but not limited to, a computer-implemented method, an autonomous vehicle system, an autonomous vehicle control system, a robotic platform system, a general robotic device control system, a computing device, etc.

Figure 1:
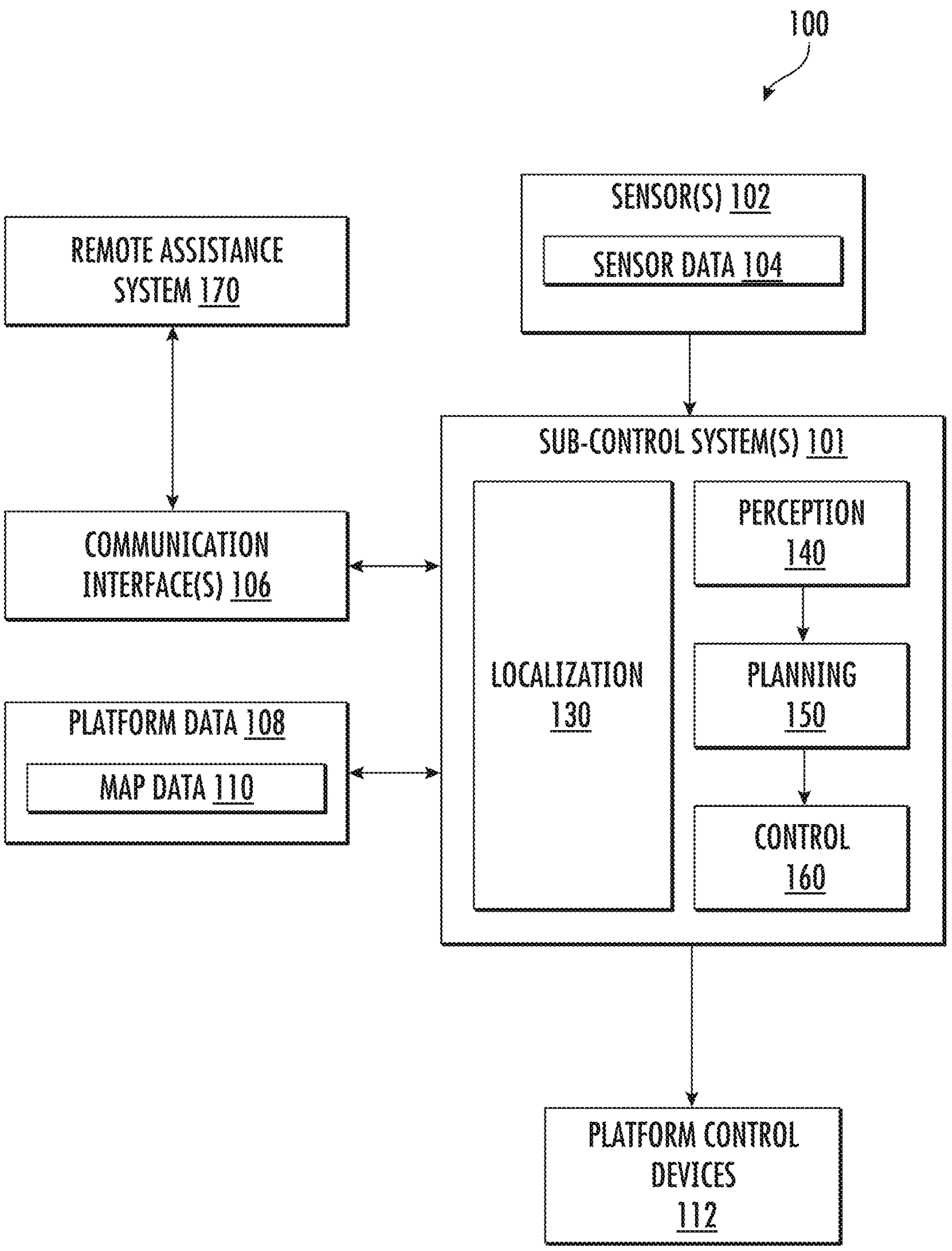
FIG. 1 depicts a block diagram of an example system, according to some implementations of the disclosure.

With reference to FIGS. 1-6, example implementations of the disclosure are discussed in further detail. FIG. 1 depicts a block diagram of an example autonomous vehicle control system 100 for an autonomous vehicle. The autonomous vehicle control system 100 can be implemented by a computing system of an autonomous vehicle. The autonomous vehicle control system 100 can include one or more sub-control systems 101 that operate to obtain inputs from sensor(s) 102 or other input devices of the autonomous vehicle control system 100. In some implementations, the sub-control system(s) 101 can additionally obtain platform data 108 (e.g., map data 110) from local or remote storage. The sub-control system(s) 101 can generate control outputs for controlling the autonomous vehicle (e.g., through platform control devices 112, etc.) based on sensor data 104, map data 110, or other data. The sub-control system 101 may include different subsystems for performing various autonomy operations. The subsystems may include a localization system 130, a perception system 140, a planning system 150, and a control system 160. The localization system 130 can determine the location of the autonomous vehicle within its environment; the perception system 140 can detect, classify, and track objects and actors in the environment; the planning system 150 can determine a trajectory for the autonomous vehicle; and the control system 160 can translate the trajectory into vehicle controls for controlling the autonomous vehicle. The sub-control system(s) 101 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the sub-control system(s) 101 can be shared among its subsystems, or a subsystem can have a set of dedicated computing resources.

In some implementations, the autonomous vehicle control system 100 can be implemented for or by an autonomous vehicle (e.g., a ground-based autonomous vehicle). The autonomous vehicle control system 100 can perform various processing techniques on inputs (e.g., the sensor data 104, the map data 110) to perceive and understand the vehicle's surrounding environment and generate an appropriate set of control outputs to implement a vehicle motion plan (e.g., including one or more trajectories) for traversing the vehicle's surrounding environment. In some implementations, an autonomous vehicle implementing the autonomous vehicle control system 100 can drive, navigate, operate, etc. with minimal or no interaction from a human operator (e.g., driver, pilot, etc.).

In some implementations, the autonomous vehicle can be configured to operate in a plurality of operating modes. For instance, the autonomous vehicle can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous vehicle can operate in a semi-autonomous operating mode in which the autonomous vehicle can operate with some input from a human operator present in the autonomous vehicle (or a human operator that is remote from the autonomous platform). In some implementations, the autonomous vehicle can enter into a manual operating mode in which the autonomous vehicle is fully controllable by a human operator (e.g., human driver, etc.) and can be prohibited or disabled (e.g., temporary, permanently, etc.) from performing autonomous navigation (e.g., autonomous driving, etc.). The autonomous vehicle can be configured to operate in other modes such as, for example, park or sleep modes (e.g., for use between tasks such as waiting to provide a trip/service, recharging, etc.). In some implementations, the autonomous vehicle can implement vehicle operating assistance technology (e.g., collision mitigation system, power assist steering, etc.), for example, to help assist the human operator of the autonomous platform (e.g., while in a manual mode, etc.).

The autonomous vehicle control system 100 can be located onboard (e.g., on or within) an autonomous vehicle and can be configured to operate the autonomous vehicle in various environments. The environment may be a real-world environment or a simulated environment. In some implementations, one or more simulation computing devices can simulate one or more of: the sensors 102, the sensor data 104, communication interface(s) 106, the platform data 108, or the platform control devices 112 for simulating operation of the autonomous vehicle control system 100.

In some implementations, the sub-control system(s) 101 can communicate with one or more networks or other systems with communication interface(s) 106. The communication interface(s) 106 can include any suitable components for interfacing with one or more network(s), including, for example, transmitters, receivers, ports, controllers, antennas, or other suitable components that can help facilitate communication. In some implementations, the communication interface(s) 106 can include a plurality of components (e.g., antennas, transmitters, or receivers, etc.) that allow it to implement and utilize various communication techniques (e.g., multiple-input, multiple-output (MIMO) technology, etc.).

In some implementations, the sub-control system(s) 101 can use the communication interface(s) 106 to communicate with one or more computing devices that are remote from the autonomous vehicle over one or more network(s). For instance, in some examples, one or more inputs, data, or functionalities of the sub-control system(s) 101 can be supplemented or substituted by a remote system communicating over the communication interface(s) 106. For instance, in some implementations, the map data 110 can be downloaded over a network to a remote system using the communication interface(s) 106. In some examples, one or more of the localization system 130, the perception system 140, the planning system 150, or the control system 160 can be updated, influenced, nudged, communicated with, etc. by a remote system for assistance, maintenance, situational response override, management, etc.

The sensor(s) 102 can be located onboard the autonomous platform. In some implementations, the sensor(s) 102 can include one or more types of sensor(s). For instance, one or more sensors can include image capturing device(s) (e.g., visible spectrum cameras, infrared cameras, etc.). Additionally, or alternatively, the sensor(s) 102 can include one or more depth capturing device(s). For example, the sensor(s) 102 can include one or more LIDAR sensor(s) or Radio Detection and Ranging (RADAR) sensor(s). The sensor(s) 102 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 102 for capturing depth information can be fixed to a rotational device in order to rotate the sensor(s) 102 about an axis. The sensor(s) 102 can be rotated about the axis while capturing data in interval sector packets descriptive of different portions of a three-hundred-and-sixty-degree view of a surrounding environment of the autonomous platform. In some implementations, one or more of the sensor(s) 102 for capturing depth information can be solid state.

The sensor(s) 102 can be configured to capture the sensor data 104 indicating or otherwise being associated with at least a portion of the environment of the autonomous vehicle. The sensor data 104 can include image data (e.g., 2D camera data, video data, etc.), RADAR data, LIDAR data (e.g., 3D point cloud data, etc.), audio data, or other types of data. In some implementations, the sub-control system(s) 101 can obtain input from additional types of sensors, such as inertial measurement units (IMUs), altimeters, inclinometers, odometry devices, location or positioning devices (e.g., GPS, compass), wheel encoders, or other types of sensors. In some implementations, the sub-control system(s) 101 can obtain sensor data 104 associated with particular component(s) or system(s) of the autonomous vehicle. This sensor data 104 can indicate, for example, wheel speed, component temperatures, steering angle, cargo or passenger status, etc. In some implementations, the sub-control system(s) 101 can obtain sensor data 104 associated with ambient conditions, such as environmental or weather conditions. In some implementations, the sensor data 104 can include multi-modal sensor data. The multi-modal sensor data can be obtained by at least two different types of sensor(s) (e.g., of the sensors 102) and can indicate static and/or dynamic object(s) or actor(s) within an environment of the autonomous vehicle. The multi-modal sensor data can include at least two types of sensor data (e.g., camera and LIDAR data). In some implementations, the autonomous vehicle can utilize the sensor data 104 for sensors that are remote from (e.g., offboard) the autonomous vehicle. This can include for example, sensor data 104 captured by a different autonomous vehicle.

The sub-control system(s) 101 can obtain the map data 110 associated with an environment in which the autonomous vehicle was, is, or will be located. The map data 110 can provide information about an environment or a geographic area. For example, the map data 110 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous vehicle in understanding its surrounding environment and its relationship thereto. In some implementations, the map data 110 can include high-definition map information. Additionally, or alternatively, the map data 110 can include sparse map data (e.g., lane graphs, etc.). In some implementations, the sensor data 104 can be fused with or used to update the map data 110 in real time.

The sub-control system(s) 101 can include the localization system 130, which can provide an autonomous vehicle with an understanding of its location and orientation in an environment. In some examples, the localization system 130 can support one or more other subsystems of the sub-control system(s) 101, such as by providing a unified local reference frame for performing, e.g., perception operations, planning operations, or control operations.

In some implementations, the localization system 130 can determine the current position of the autonomous vehicle. A current position can include a global position (e.g., respecting a georeferenced anchor, etc.) or relative position (e.g., respecting objects in the environment, etc.). The localization system 130 can generally include or interface with any device or circuitry for analyzing a position or change in position of an autonomous vehicle. For example, the localization system 130 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous vehicle can be used by various subsystems of the sub-control system(s) 101 or provided to a remote computing system (e.g., using the communication interface(s) 106).

In some implementations, the localization system 130 can register relative positions of elements of a surrounding environment of the autonomous vehicle with recorded positions in the map data 110. For instance, the localization system 130 can process the sensor data 104 (e.g., LIDAR data, RADAR data, camera data, etc.) for aligning or otherwise registering to a map of the surrounding environment (e.g., from the map data 110) to understand the autonomous vehicle's position within that environment. Accordingly, in some implementations, the autonomous vehicle can identify its position within the surrounding environment (e.g., across six axes, etc.) based on a search over the map data 110. In some implementations, given an initial location, the localization system 130 can update the autonomous vehicle's location with incremental re-alignment based on recorded or estimated deviations from the initial location. In some implementations, a position can be registered directly within the map data 110.

In some implementations, the map data 110 can include a large volume of data subdivided into geographic tiles, such that a desired region of a map stored in the map data 110 can be reconstructed from one or more tiles. For instance, a plurality of tiles selected from the map data 110 can be stitched together by the sub-control system 101 based on a position obtained by the localization system 130 (e.g., a number of tiles selected in the vicinity of the position).

In some implementations, the localization system 130 can determine positions (e.g., relative or absolute) of one or more attachments or accessories for an autonomous vehicle. For instance, an autonomous vehicle can be associated with a cargo platform, and the localization system 130 can provide positions of one or more points on the cargo platform. For example, a cargo platform can include a trailer or other device towed or otherwise attached to or manipulated by an autonomous vehicle, and the localization system 130 can provide for data describing the position (e.g., absolute, relative, etc.) of the autonomous vehicle as well as the cargo platform. Such information can be obtained by the other autonomy systems to help operate the autonomous vehicle.

The sub-control system(s) 101 can include the perception system 140, which can allow an autonomous platform to detect, classify, and track objects and actors in its environment. Environmental features or objects perceived within an environment can be those within the field of view of the sensor(s) 102 or predicted to be occluded from the sensor(s) 102. This can include object(s) not in motion or not predicted to move (static objects) or object(s) in motion or predicted to be in motion (dynamic objects/actors).

The perception system 140 can determine one or more states (e.g., current or past state(s), etc.) of one or more objects that are within the surrounding environment of an autonomous vehicle. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 140 can determine the state(s) using one or more algorithms or machine-learned models configured to identify/classify objects based on inputs from the sensor(s) 102. The perception system can use different modalities of the sensor data 104 to generate a representation of the environment to be processed by the one or more algorithms or machine-learned models. In some implementations, state(s) for one or more identified or unidentified objects can be maintained and updated over time as the autonomous vehicle continues to perceive or interact with the objects (e.g., maneuver with or around, yield to, etc.). In this manner, the perception system 140 can provide an understanding about a current state of an environment (e.g., including the objects therein, etc.) informed by a record of prior states of the environment (e.g., including movement histories for the objects therein). Such information can be helpful as the autonomous vehicle plans its motion through the environment.

The sub-control system(s) 101 can include the planning system 150, which can be configured to determine how the autonomous platform is to interact with and move within its environment. The planning system 150 can determine one or more motion plans for an autonomous platform. A motion plan can include one or more trajectories (e.g., motion trajectories) that indicate a path for an autonomous vehicle to follow. A trajectory can be of a certain length or time range. The length or time range can be defined by the computational planning horizon of the planning system 150. A motion trajectory can be defined by one or more waypoints (with associated coordinates). The waypoint(s) can be future location(s) for the autonomous platform. The motion plans can be continuously generated, updated, and considered by the planning system 150.

The planning system 150 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 150 can determine a desired trajectory for executing a strategy. For instance, the planning system 150 can obtain one or more trajectories for executing one or more strategies. The planning system 150 can evaluate trajectories or strategies (e.g., with scores, costs, rewards, constraints, etc.) and rank them. For instance, the planning system 150 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 150 can utilize static cost(s) to evaluate trajectories for the autonomous platform (e.g., "avoid lane boundaries," "minimize jerk," etc.). Additionally, or alternatively, the planning system 150 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 150 can rank trajectories based on one or more static costs, one or more dynamic costs, or a combination thereof. The planning system 150 can select a motion plan (and a corresponding trajectory) based on a ranking of a plurality of candidate trajectories. In some implementations, the planning system 150 can select the highest ranked candidate, or a highest ranked feasible candidate.

The planning system 150 can then validate the selected trajectory against one or more constraints before the trajectory is executed by the autonomous platform.

To help with its motion planning decisions, the planning system 150 can be configured to perform a forecasting function. The planning system 150 can forecast future state(s) of the environment. This can include forecasting the future state(s) of other actors in the environment. In some implementations, the planning system 150 can forecast future state(s) based on current or past state(s) (e.g., as developed or maintained by the perception system 140). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous vehicle. Additionally, or alternatively, the probabilities can include probabilities conditioned on trajectory options available to one or more other actors.

To implement selected motion plan(s), the sub-control system(s) 101 can include a control system 160 (e.g., a vehicle control system). Generally, the control system 160 can provide an interface between the sub-control system(s) 101 and the platform control devices 112 for implementing the strategies and motion plan(s) generated by the planning system 150. For instance, the control system 160 can implement the selected motion plan/trajectory to control the autonomous platform's motion through its environment by following the selected trajectory (e.g., the waypoints included therein). The control system 160 can, for example, translate a motion plan into instructions for the appropriate platform control devices 112 (e.g., acceleration control, brake control, steering control, etc.). By way of example, the control system 160 can translate a selected motion plan into instructions to adjust a steering component (e.g., a steering angle) by a certain number of degrees, apply a certain magnitude of braking force, increase/decrease speed, etc. In some implementations, the control system 160 can communicate with the platform control devices 112 through communication channels including, for example, one or more data buses (e.g., controller area network (CAN), etc.), onboard diagnostics connectors (e.g., OBD-II, etc.), or a combination of wired or wireless communication links. The platform control devices 112 can send or obtain data, messages, signals, etc. to or from the sub-control system(s) 101 (or vice versa) through the communication channel(s).

The sub-control system(s) 101 can receive, through communication interface(s) 106, assistive signal(s) from remote assistance system 170. Remote assistance system 170 can communicate with the sub-control system(s) 101 over a network. In some implementations, the sub-control system(s) 101 can initiate a communication session with the remote assistance system 170. For example, the sub-control system(s) 101 can initiate a session based on or in response to a trigger. In some implementations, the trigger may be an alert, an error signal, a map feature, a request, a location, a traffic condition, a road condition, etc.

After initiating the session, the sub-control system(s) 101 can provide context data to the remote assistance system 170. The context data may include sensor data 104 and state data of the autonomous vehicle. For example, the context data may include a live camera feed from a camera of the autonomous vehicle and the autonomous vehicle's current speed. An operator (e.g., human operator) of the remote assistance system 170 can use the context data to select assistive signals. The assistive signal(s) can provide values or adjustments for various operational parameters or characteristics for the sub-control system(s) 101. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the sub-control system(s) 101.

The sub-control system(s) 101 can use the assistive signal(s) for input into one or more autonomy subsystems for performing autonomy functions. For instance, the planning system 150 can receive the assistive signal(s) as an input for generating a motion plan. For example, assistive signal(s) can include constraints for generating a motion plan. Additionally, or alternatively, assistive signal(s) can include cost or reward adjustments for influencing motion planning by the planning system 150. Additionally, or alternatively, assistive signal(s) can be considered by the sub-control system(s) 101 as suggestive inputs for consideration in addition to other received data (e.g., sensor inputs, etc.).

The sub-control system(s) 101 may be platform agnostic, and the control system 160 can provide control instructions to platform control devices 112 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 2:
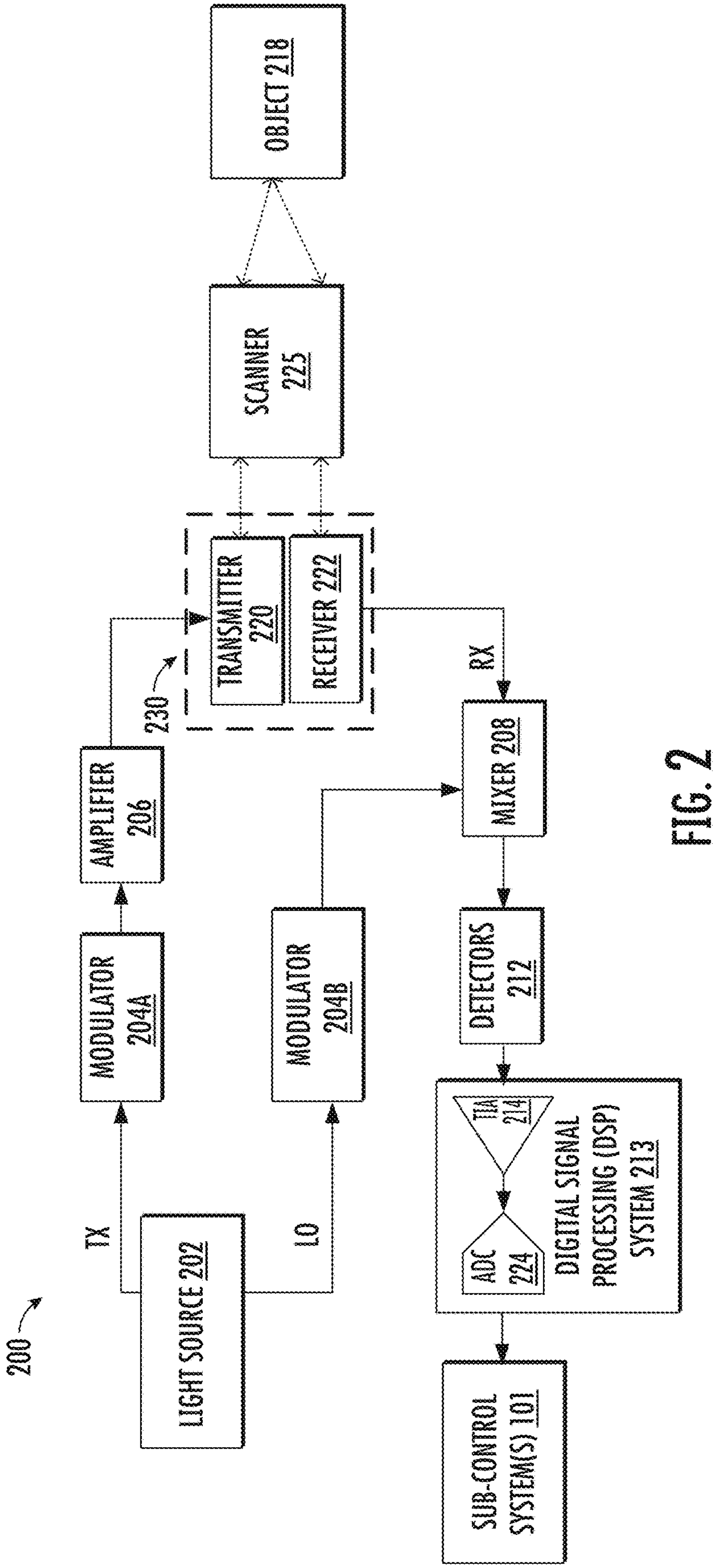
FIG. 2 depicts a block diagram of an example LIDAR system, according to some implementations of the disclosure.

FIG. 2 is a block diagram illustrating an example LIDAR system 200 for vehicles (e.g., autonomous vehicles). The environment includes a LIDAR system 200 that includes a transmit (TX) path and a receive (RX) path. The TX path includes one or more TX input/output ports (e.g., channels), and the RX path includes one or more RX input/output ports (e.g., channels). In some implementations, a semiconductor substrate and/or semiconductor package may include the TX path and/or the RX path. In some implementations, the semiconductor substrate and/or semiconductor package may include at least one of silicon photonics circuitry, programmable logic controller (PLC), or group III-V semiconductor circuitry.

In some implementations, a first semiconductor substrate and/or a first semiconductor package may include the TX path and a second semiconductor substrate and/or a second semiconductor package may include the RX path. In some arrangements, the RX input/output ports and/or the TX input/output ports may occur (or be formed/disposed/located/placed) along one or more edges of one or more semiconductor substrates and/or semiconductor packages.

The LIDAR system 200 can be coupled to one or more sub-control system(s) 101 (e.g., the sub-control system(s) 101 of FIG. 1). In some implementations, the sub-control system(s) 101 may be coupled to the RX path via the one or more RX input/output ports. For instance, the sub-control system(s) 101 can receive LIDAR outputs from the LIDAR system 200. The sub-control system(s) 101 can control a vehicle (e.g., an autonomous vehicle) based on the LIDAR outputs.

The TX path may include a light source (e.g., laser source) 202, a modulator 204A, a modulator 204B, an amplifier 206, one or more transmitters 220, and scanner 225. The RX path may include scanner 225, one or more receivers 222, a mixer 208, a detector 212, a digital signal processing (DSP) system 213, a transimpedance amplifier (TIA) 214, and one or more analog-to-digital converters (ADCs) 224. In some examples, the components of LIDAR system 200 can function together to encode an optical signal and scatter the encoded optical signal into free-space using optics. By detecting the signal differences (e.g., frequency or phase differences) between the encoded optical signal transmitted by the TX path and a returned signal reflected back from an object and received at RX path, the LIDAR system 200 can determine the location of the object (including range/distance from the LIDAR system 200 to object 218) and/or precisely measure the velocity of the object 218 using the Doppler effect.

Although FIG. 2 shows only a select number of components and only one input/output channel, the LIDAR system 200 may include any number of components and/or input/output channels (in any combination) that are interconnected in any arrangement to facilitate combining multiple functions of a LIDAR system, to support the operation of a vehicle.

The light source 202 may be configured to generate a light signal (or beam) that is derived from (or associated with) a local oscillator (LO) signal. In some implementations, the light signal may have an operating wavelength that is equal to or substantially equal to 1550 nanometers. In some implementations, the light signal may have an operating wavelength that is between 1400 nanometers and 1440 nanometers. In some implementations, the light signal may have an operating wavelength of between 950 nanometers and 1550 nanometers.

The light source 202 may be configured to provide the light signal to the modulator 204A, which is configured to modulate a phase and/or a frequency of the light signal based on a first radio frequency (RF) signal (e.g., an "RF1" signal) to generate a modulated and optionally encoded light signal, such as by Continuous Wave (CW) modulation or quasi-CW modulation. As such, LIDAR system 200 can be a frequency modulated (FM) LIDAR system or a phase modulated (PM) LIDAR system. In some implementations, when an FM LIDAR system 200 may use a continuous wave it is referred to as "FMCW LIDAR," and when an FM LIDAR system 200 uses a quasi-continuous wave it is referred to as "FMQW LIDAR".

The modulator 204A may be configured to send the modulated light signal to the amplifier 206. The amplifier 206 may be configured to amplify the modulated light signal to generate an amplified light signal for transmission via the one or more transmitters 220. The one or more transmitters 220 may include one or more optical waveguides or antennas. In some implementations, modulator 204A and/or modulator 204B may have a bandwidth between 400 megahertz (MHz) and 1000 (MHz).

The LIDAR system 200 includes one or more transmitters 220 and one or more receivers 222. The transmitter(s) 220 and/or receiver(s) 222 can be included in a transceiver 230. The transmitter(s) 220 can provide the transmit beam that it receives from the TX path into an environment within a given field of view toward an object 218. The one or more receivers 222 can receive a received beam reflected from the object 218 and provide the received beam to the mixer 208 of the RX path. The one or more receivers 222 may include one or more optical waveguides or antennas. In some arrangements, the one or more transceivers 230 may include a monostatic transceiver or a bistatic transceiver.

In some examples, transceiver 230 can include optics configured to receive a TX optical waveform, which is input to the scanner 225 as a TX signal. The TX signal may be transmitted through the scanner 225 to illuminate an object 218 (or an area of interest). The scanner 225 may receive a return optical signal reflected by the object 218 as a receive (RX) optical signal. In some implementations, scanner 225 may be a resonant scanner such as scanner 3000 of FIGS. 3A-3E. Scanner 225 may include one or more scanning optics, such as one or more polygon reflectors or deflectors to adjust the angle of received beams relative to outputted beams based on the orientation of outer surfaces (e.g., facets) of the optics relative to the received beam, or solid-state components (e.g., phased arrays, electro-optic crystals) configured to modify the direction of received light. In some implementations, the mixer 208 may mix the RX signal with the LO signal to produce an optical signal, which may be then detected by the detector 212 and further delivered to the digital sampling system of the DSP system 213 as analog data input.

The light source 202 may be configured to provide the LO signal to the modulator 204B, which is configured to modulate a phase and/or a frequency of the LO signal based on a second RF signal (e.g., an "RF2" signal) to generate a modulated LO signal (e.g., using Continuous Wave (CW) modulation or quasi-CW modulation) and send the modulated LO signal to the mixer 208 of the RX path. The mixer 208 may be configured to mix (e.g., combine, multiply, etc.) the modulated LO signal with the returned signal to generate a down-converted signal and send the down-converted signal to the detector 212.

In some arrangements, the mixer 208 may be configured to send the modulated LO signal to the detector 212. The detector 212 may be configured to generate an electrical signal based on the down-converted signal and send the electrical signal to the DSP system 213, which may include at least TIA 214 and one or more digitizers such as ADCs 224. In some examples, the ADCs 224 may be part of a digital sampling system that includes additional components such as but not limited to a digital mixer (e.g., a direct digital synthesizer (DDS), digital multipliers), one or more filters (e.g., a low pass filter), and a down-sampler. In some implementations, DSP system 213 may include circuits or one or more processors configured to perform demodulation, decoding, and related tasks. These circuits may be generally based on application-specific ICs (ASICs), field-programmable gate arrays (FPGAs) and programmable DSP devices.

In some arrangements, the detector 212 may be configured to generate an electrical signal based on the down-converted signal and the modulated signal. The TIA 214 may be configured to amplify the electrical signal and send the amplified electrical signal to the sub-control system(s) 101 via the one or more ADCs 224 and/or other components of DSP system 213. In some implementations, the TIA 214 may have a peak noise-equivalent power (NEP) that is less than 5 picowatts per square root Hertz (i.e., 5x10-12 Watts per square root Hertz). In some implementations, the TIA 214 may have a gain between 4 kiloohms and 25 kiloohms. In some implementations, detector 212 and/or TIA 214 may have a 3-decibel bandwidth between 80 kilohertz (kHz) and 450 megahertz (MHz).

The sub-control system(s) 101 may be configured to determine a distance to the object 218 and/or measure the velocity of the object 218 based on the one or more electrical signals that it receives from the TIA 214 via the one or more ADCs 224.

Figure 3A:
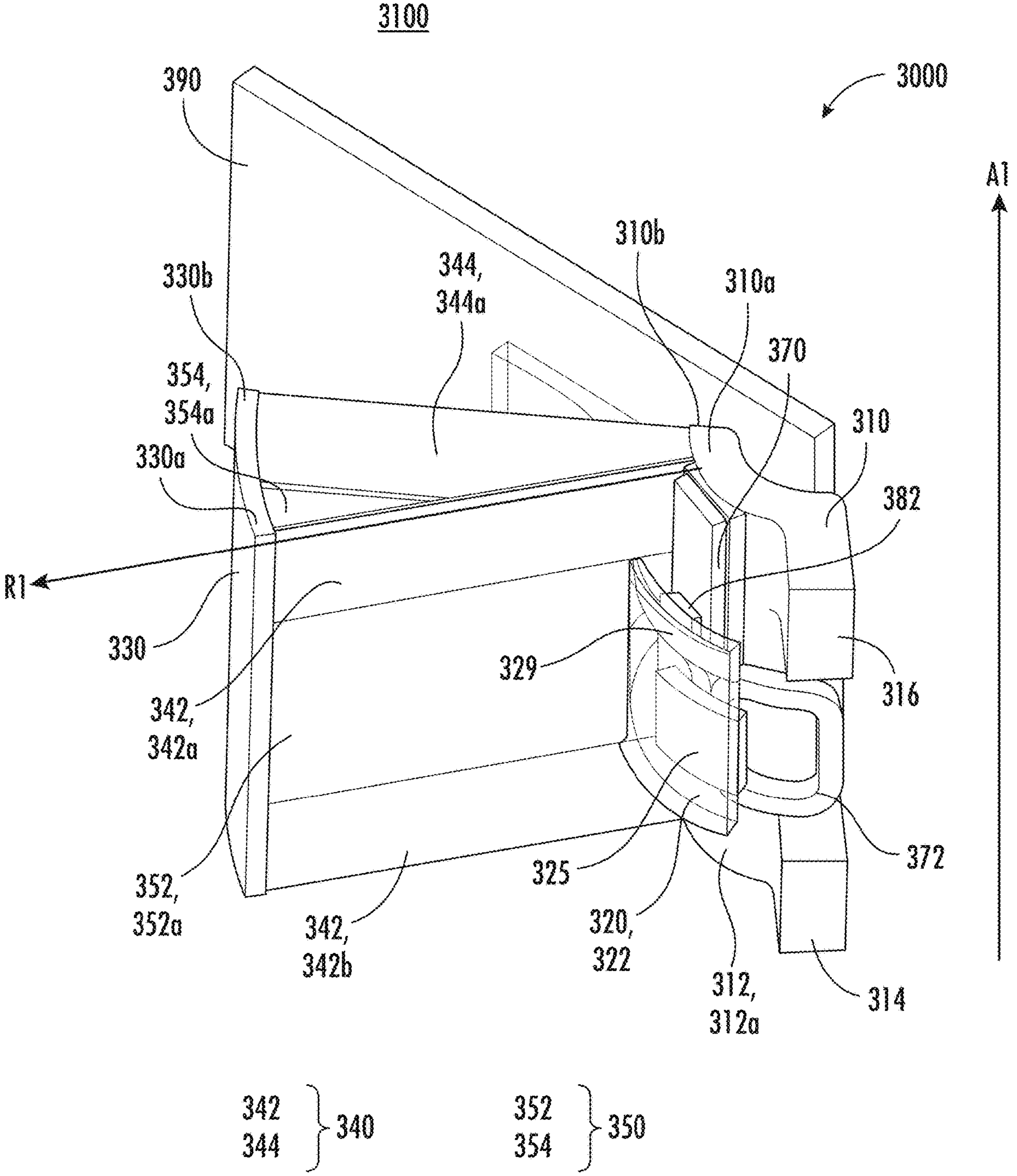
FIGS. 3A-3E depict an example scanner for a LIDAR system, according to some implementations of the disclosure.
Figure 3B:
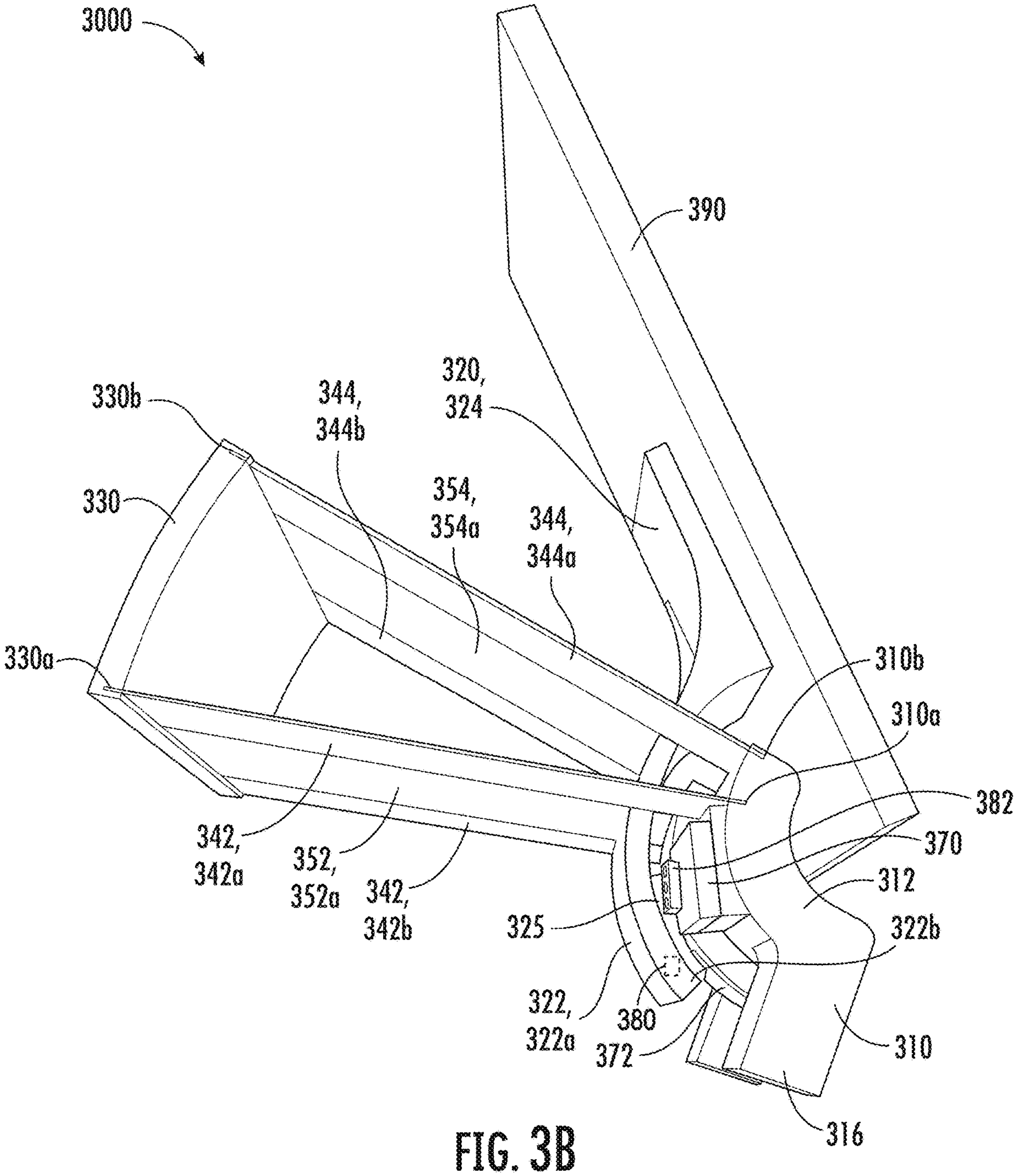
Figure 3C:
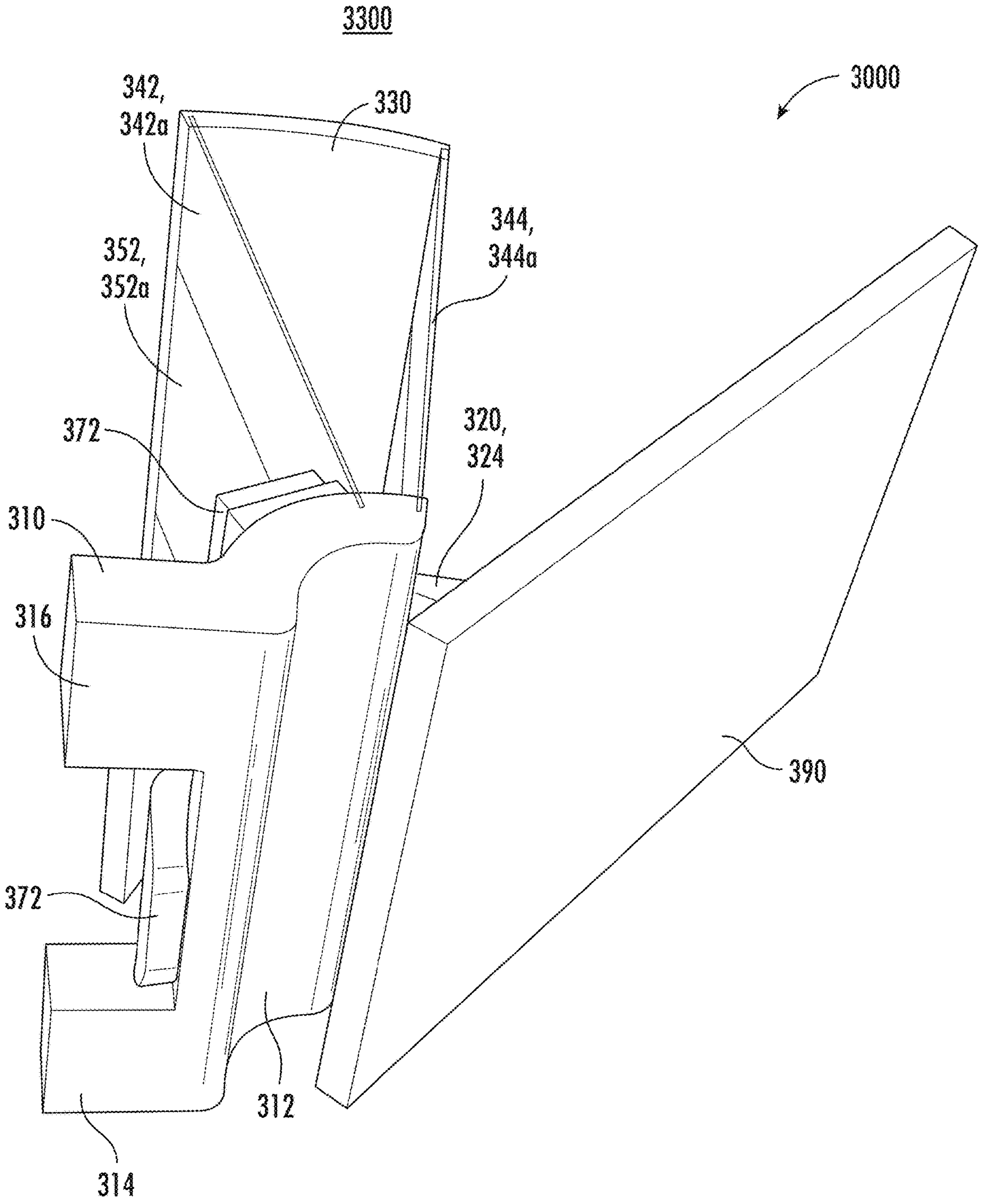
Figure 3D:
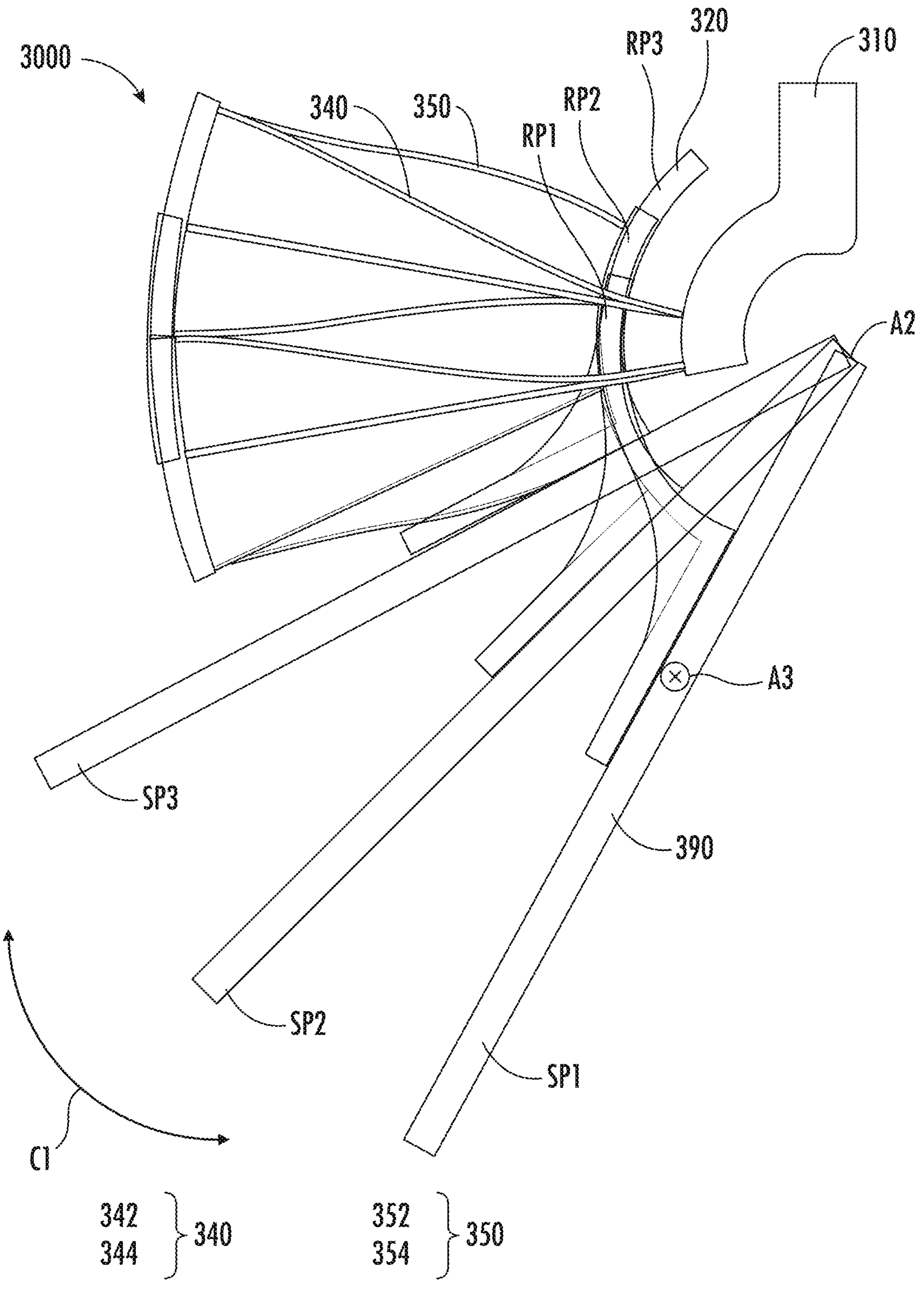
Figure 3E:
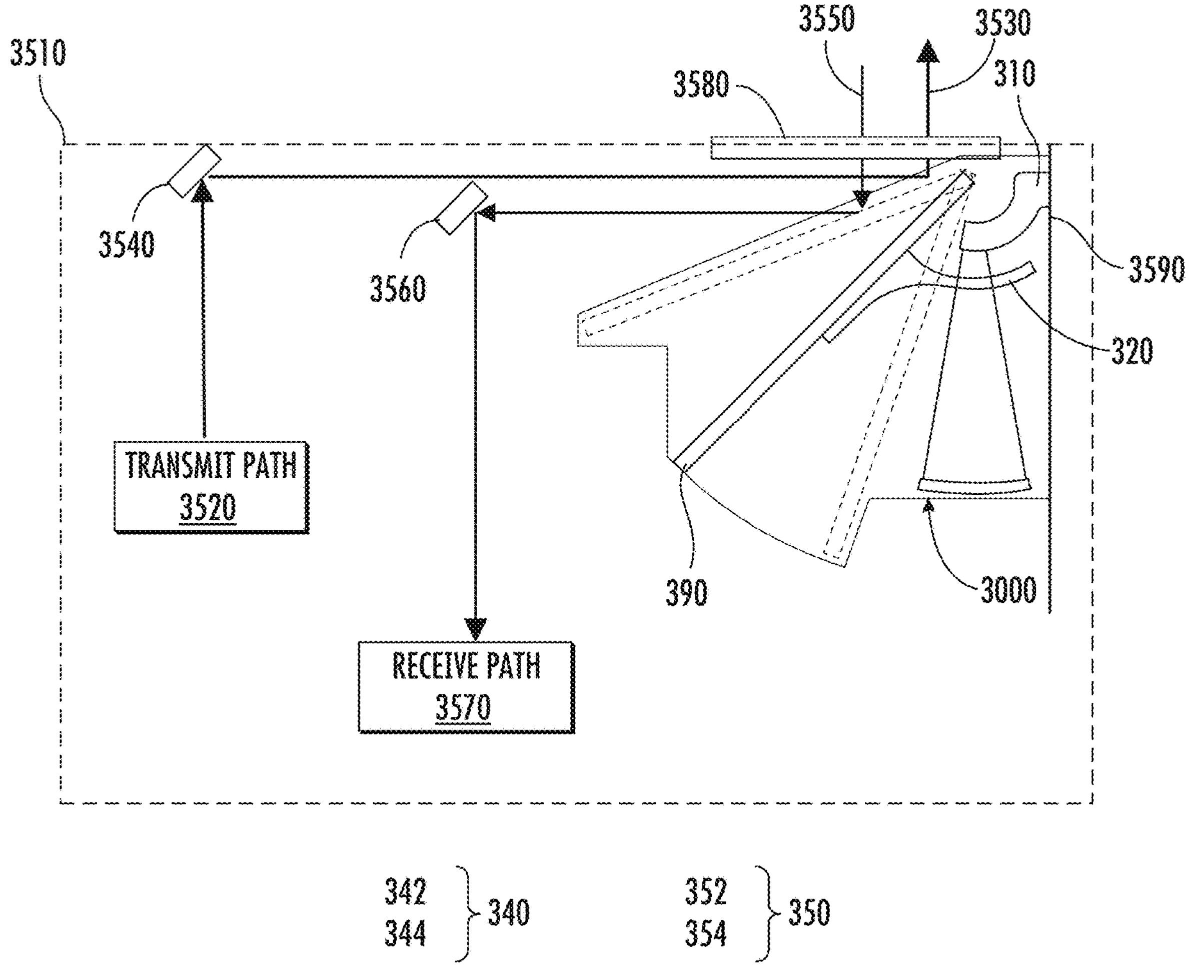

FIGS. 3A-3E depict a scanner 3000 for a LIDAR system, according to some implementations of the present disclosure. FIG. 3A depicts a rear view (first view 3100) of the scanner 3000, FIG. 3B depicts a side view (second view 3200) of the scanner 3000, FIG. 3C depicts a front view (third view 3300) of the scanner 3000, FIG. 3D depicts an overhead view of the flexure stages of the scanner 3000 deflecting while the coils of the scanner 3000 are driven, and FIG. 3E depicts the scanner 3000 provided in an example LIDAR system. Referring to FIG. 3A, the first view 3100 shows the scanner 3000 including a rigid body 310 (a first portion), a rotatable body 320 (a second portion), and a scan element 390 (e.g., a mirror). The scanner 3000 further includes one or more coils 372 disposed on the rigid body 310, one or more magnets 325 disposed on the rotatable body 320 adjacent to the one or more coils 372, a first flexure stage 340 coupled at a first end to the rigid body 310, a second flexure stage 350 coupled at a first end to the rotatable body 320, and a connection body 330 (connection portion or bridge portion) coupled to a second end of the first flexure stage 340 and a second end of the second flexure stage 350. The first flexure stage 340, second flexure stage 350, and connection body 330 can form a flexure assembly.

According to examples of the disclosure, the rigid body 310 includes the one or more drive coils 372, the rotatable body 320 includes the one or more magnets 325, and the rotatable body 320 is connected to the rigid body 310 (i.e., indirectly) via the connection body 330 and the first flexure stage 340 and the second flexure stage 350. The first flexure stage 340 and the second flexure stage 350 are configured to oscillate in response to a force exerted on the one or more magnets 325 when the one or more drive coils 372 are driven, thereby causing the rotatable body 320 to rotate, and the scan element 390 is configured to rotate via rotation of the rotatable body 320 and to direct light emitted by a light source (e.g., light source 202) to an environment (e.g., an environment of a vehicle). The first flexure stage 340 and the second flexure stage 350 may be formed of steel plates. In particular, flexure components of the first flexure stage 340 and the second flexure stage 350 may be formed of steel plates.

Referring to FIGS. 3A-3C, at least a portion of the first flexure stage 340 and at least a portion of the second flexure stage 350 lie in a same plane, the same plane being parallel to the axial direction A1 and the axis of rotation A2 of the scan element 390. The first flexure stage 340 includes a first plurality of flexure components including a first flexure component 342 and a second flexure component 344 and the second flexure stage 350 includes a second plurality of flexure components including a first flexure component 352 and a second flexure component 354. The flexure components of the first flexure stage 340 and the second flexure stage 350 are configured to oscillate in response to a force exerted on the one or more magnets 325 when the one or more coils 372 are driven, thereby causing the rotatable body 320 to rotate, and correspondingly the scan element 390 rotates via rotation of the rotatable body 320. The scanner 3000 may be implemented in various LIDAR systems (e.g., LIDAR system 200), including a time-of-flight (ToF) LIDAR system. In some implementations, the scanner 3000 can include a counterweight 380 which is disposed opposite the scan element 390 with respect to the plane of symmetry of the flexure assembly to keep unwanted motion of the scanner 3000 under vibration minimized. For example, the counterweight 380 can be disposed at the rotatable body 320 (e.g., on the first side 322*a* and/or the second side 322*b* of the arched portion 322. However, the disclosure is not limited to these examples and the counterweight 380 could be disposed at one or more additional or alternative locations.

Referring to FIGS. 3A-3E, the rigid body 310 can include a curved portion 312 (curved section), a first protruding portion 314 (first foot), and a second protruding portion 316 (second foot). The first protruding portion 314 and the second protruding portion 316 extend from a first end or first side of the curved portion 312. A second end or second side of the curved portion 312 may be spaced apart from the scan element 390 in a circumferential direction C1 (see FIG. 3D) and spaced apart from the rotatable body 320 in a radial direction R1 (see FIG. 3A). In some implementations, the first protruding portion 314, the second protruding portion 316, and the curved portion 312 are integrally formed as a single piece. In some implementations, the first protruding portion 314 and the second protruding portion 316 may be fixed to (secured to, mounted to, etc.) an interior enclosure of the LIDAR system so that the rigid body 310 remains in a fixed or stationary position while the rotatable body 320 and the scan element 390 rotate.

The rotatable body 320 includes an arched portion 322 to which one end of the second flexure stage 350 is coupled and a base portion 324 to which the scan element 390 is coupled. The base portion 324 extends from a first end or first side of the arched portion 322 and is disposed in a same plane as the scan element 390. A second end or second side of the arched portion 322 may be spaced apart from the first protruding portion 314 and the second protruding portion 316 in the circumferential direction C1 (see FIG. 3D) and spaced apart from the curved portion 312 of the rigid body 310 in the radial direction R1 (see FIG. 3A). In some implementations, the arched portion 322 and the base portion 324 are integrally formed as a single piece. In some implementations, the arched portion 322 has a same radius of curvature as the curved portion 312. As illustrated in FIG. 3A, the arched portion 322 may have a length in the axial direction A1 which is less than a length of the rigid body 310 in the axial direction A1 and may be disposed axially between the first spring component 342*a* and the second spring component 342*b* of the first flexure component 342 and between the third spring component 344*a* and the fourth spring component 344*b* of the second flexure component 344 in the axial direction A1.

Referring to FIGS. 3A-3C, the scanner 3000 may include a circuit board 370 including a plurality of electronic components. For example, the plurality of electronic components may include one or more encoders 382, one or more drive circuits (not shown), and/or one or more controllers (not shown). The one or more coils 372 are disposed on an outer surface of a first side 312*a* of the curved portion 312. In some implementations, the one or more coils 372 may include air coils, drive coils, etc. and be filled with air or a higher magnetic flux material. To achieve a compact structure, in some implementations, various components may be disposed within confined areas of the scanner 3000. For example, the circuit board 370 and one or more coils 372 may be disposed radially in a space between the rotatable body 320 and the rigid body 310 (e.g., in the radial direction R1 extending from the curved portion 312). The circuit board 370 may be disposed axially in a space (in an axial direction A1) between axial ends of the rigid body 310. The one or more coils 372 may be disposed axially in a space between axial ends of the rotatable body 320. As illustrated in FIGS. 3A-3C, the circuit board 370, one or more coils 372, one or more magnets 325, encoder strip 329, and encoder 382 may be disposed at least partially to one side of the first flexure stage 340 and the second flexure stage 350 in the circumferential direction C1. For example, the circuit board 370, one or more magnets 325, encoder strip 329, and encoder 382 may be disposed entirely to one side of the first flexure stage 340 and the second flexure stage 350 in the circumferential direction C1.

The encoder 382 (e.g., a quadrature encoder) may be disposed on the curved portion 312 of the rigid body 310 and be configured to measure at least one of a position of the rotatable body 320 and a direction of movement of the rotatable body 320. For example, the encoder 382 can include one or more encoder readers (one or more detectors or sensors such as an optical sensor) which may be disposed on the rigid body 310 and which are configured to detect markings that are provided on the encoder strip 329 (e.g., a reflective adhesive strip) which is disposed on the inner surface of a second side 322*b* of the rotatable body 320. In some implementations, the encoder 382 is configured to determine the position information based on a number of pulses or square waves generated and/or by counting transitions in reflected light intensity from the encoder strip 329.

Referring to FIGS. 3A-3C, the rotatable body 320 can include an encoder strip 329 and the one or more magnets 325 (e.g., permanent magnets, permanent arc magnets, etc.) which are disposed to face in a direction toward the one or more coils 372. The one or more magnets 325 may be disposed on an inner surface of a second side 322*b* of the arched portion 322.

The one or more coils 372 may be mounted on the first side 312*a* of the curved portion 312 and be wound about an axis (e.g., an axis which is parallel to a radial direction) which is transverse to an axis of rotation of the scan element 390 (e.g., axis A2 as shown in FIG. 3E) as well as an axis of rotation of the rotatable body 320 which are parallel to the axial direction A1. For example, when a current is applied to the one or more coils 372, the flux direction is transverse to (e.g., perpendicular to) the axis of rotation of the scan element 390 and the axis of rotation of the rotatable body 320. The magnetic field generated by the one or more coils 372 interacts with the magnetic field of the one or more magnets 325, and a force (a torque) is exerted on the one or more magnets 325 which causes the rotatable body 320, to which the one or more magnets 325 are mounted, to rotate. Flexure components of the first flexure stage 340 and the second flexure stage 350 are configured to oscillate in response to the torque (rotational force) that is applied to the rotatable body 320 including the one or more magnets 325, thereby causing the scan element 390 to rotate.

Flexure components of the first flexure stage 340 of the scanner 3000 may be coupled to respective grooves provided in the curved portion 312 and respective grooves provided in the connection body 330. Similarly, flexure components of the second flexure stage 350 of the scanner 3000 may be coupled to respective grooves provided in the rotatable body 320 and respective grooves provided in the connection body 330.

Referring to FIGS. 3A-3C, the curved portion 312 includes a first groove 310*a* and a second groove 310*b* disposed on an outer surface of a first side 312*a* of the curved portion 312 which faces in a direction (e.g., radial direction R1) toward the rotatable body 320. The first flexure stage 340 includes a first plurality of flexure components including a first flexure component 342 having a first plurality of spring components (e.g., a first spring component 342*a* and a second spring component 342*b*) and a second flexure component 344 having a second plurality of spring components (e.g., a third spring component 344*a* and a fourth spring component 344*b*). The first spring component 342*a* and the second spring component 342*b* lie in a first plane and the third spring component 344*a* and the fourth spring component 344*b* lie in a second plan. In some implementations, the spring components of the first flexure stage 340 may include a leaf-spring. The first flexure component 342 includes a first end coupled to the rigid body 310 and a second end coupled to the connection body 330, and the second flexure component 344 includes a first end coupled to the rigid body 310 and a second end coupled to the connection body 330, the first flexure component 342 being spaced apart from the second flexure component 344 in a circumferential direction C1 of the rotatable body 320.

The first spring component 342*a* has a first end disposed in and coupled to the first groove 310*a* of the curved portion 312 and a second end disposed in and coupled to a groove 330*a* of the connection body 330. The second spring component 342*b* similarly has a first end disposed in and coupled to a groove of the curved portion 312 and a second end disposed in and coupled to a groove of the connection body 330. The first spring component 342*a* and the second spring component 342*b* are parallel with one another and lie in a same plane with each other, and are spaced apart from each other in the axial direction A1 with a first spring component 352*a* of the second flexure stage 350 disposed between them. A first gap is provided between the first spring component 352*a* of the second flexure stage 350 and the first spring component 342*a* of the first flexure stage 340 and a second gap is provided between the first spring component 352*a* of the second flexure stage 350 and the second spring component 342*b* of the first flexure stage 340.

The third spring component 344*a* has a first end disposed in and coupled to second groove 310*b* of the curved portion 312 and a second end disposed in and coupled to a groove 330*b* of the connection body 330. The fourth spring component 344*b* similarly has a first end disposed in and coupled to a groove of the curved portion 312 and a second end disposed in and coupled to a groove of the connection body 330. The third spring component 344*a* and the fourth spring component 344*b* are parallel with one another and lie in a same plane with each other, and are spaced apart from each other in the axial direction A1 with a second spring component 354*a* of the second flexure stage 350 disposed between them. A first gap is provided between the second spring component 354*a* of the second flexure stage 350 and the third spring component 344*a* of the first flexure stage 340 and a second gap is provided between the second spring component 354*a* of the second flexure stage 350 and the fourth spring component 344*b* of the first flexure stage 340.

In some implementations, the first ends of the spring components of the first flexure component 342 and the second flexure component 344 are welded to the curved portion 312 and the second ends of the spring components of the first flexure component 342 and the second flexure component 344 are welded to the connection body 330. However, the disclosure is not limited to this implementation, and the ends of the spring components may be secured via other additional and/or alternative methods (e.g., adhesives, fixing components, etc.).

The second flexure stage 350 includes a second plurality of flexure components including a first flexure component 352 having a first end coupled to the rotatable body 320 and a second end coupled to the connection body 330, and a second flexure component 354 having a first end coupled to the rotatable body 320 and a second end coupled to the connection body 330, the first flexure component 352 being spaced apart from the second flexure component 354 in a circumferential direction C1 of the rotatable body 320. The first flexure component 352 of the second flexure stage 350 is disposed between the first spring component 342*a* and the second spring component 342*b* of the first flexure stage 342 in the first plane, and the second flexure component 354 of the second flexure stage 350 is disposed between the third spring component 344*a* and the fourth spring component 344*b* of the first flexure stage 340 in the second plane. The first flexure component 352 includes the first spring component 352*a* and the second flexure component 354 includes the second spring component 354*a*. In some implementations, the spring components of the second flexure stage 350 may include a leaf-spring. The first flexure component 352 including the first spring component 352*a* may be parallel to and lie in the same plane as the first spring component 342*a* and the second spring component 342*b* of the first flexure component 342 of the first flexure stage 340. The second flexure component 354 including the second spring component 354*a* may be parallel to and lie in the same plane as the third spring component 344*a* and the fourth spring component 344*b* of the second flexure component 344 of the first flexure stage 340.

In some implementations, the first spring component 352*a* may have a first end disposed in and coupled to a groove provided in an outer surface of a first side 322*a* of the arched portion 322 and a second end disposed in and coupled to a groove of the connection body 330. The second spring component 354*a* similarly can have a first end disposed in and coupled to a groove provided in the outer surface of the first side 322*a* of the arched portion 322 and a second end disposed in and coupled to a groove of the connection body 330. In some implementations, the first ends of the spring components of the first flexure component 352 and the second flexure component 354 are welded to the arched portion 322 and the second ends of the spring components of the first flexure component 352 and the second flexure component 354 are welded to the connection body 330. However, the disclosure is not limited to this implementation, and the ends of the spring components may be secured via other additional and/or alternative methods (e.g., adhesives, fixing components, etc.).

In the example scanner 3000, each flexure component of the first flexure stage 340 has two spring components and each flexure component of the second flexure stage 350 has one spring component, however the disclosure is not limited to this example. In some implementations, each flexure component may have less than or more than the number of spring components illustrated in the drawings (e.g., two spring components, three spring components, etc.).

The first flexure stage and the second flexure stage (and their corresponding flexure components and spring components) may be configured to be driven at their natural or fundamental resonant frequency which causes the spring components to resonate or vibrate, thereby causing the rotatable body 320 and the scan element 390 (e.g., a mirror) to be rotated.

The scan element 390 can have a variable field of view, where the field of view can be adjusted according to a magnitude of a supply of current supplied to drive the one or more coils 372. In some implementations, the variable field of view can range from between about 0 degrees and about 150 degrees. In some implementations, the scan element 390 can be displaced between about 45 degrees and about 75 degrees, or more particularly about 60 degrees (e.g., +/−30 degrees from a center position) while consuming a low amount of power (e.g., less than ten watts, less than five watts, etc.). In some implementations, the scan element 390 has a reflective surface area of between about two square inches and about ten square inches, or more particularly between about five square inches and about ten square inches.

In some implementations, the first flexure component 342 and the second flexure component 344 of the first flexure stage 340 may be separated or spaced apart from each other by about 10 degrees to about 30 degrees (more particularly from about 10 degrees to about 15 degrees) in the circumferential direction C1 of the rotatable body 320. In some implementations, the first flexure component 352 and the second flexure component 354 of the second flexure stage 350 may be separated or spaced apart from each other by about 10 degrees to about 30 degrees (more particularly from about 10 degrees to about 15 degrees) in the circumferential direction C1 of the rotatable body 320. A radial length of the first plurality of flexure components (e.g., the first flexure component 342 and second flexure component 344) may be longer than the radial length of the second plurality of flexure components (e.g., the first flexure component 352 and second flexure component 354). An axial length of the spring components of the first plurality of flexure components (e.g., the first flexure component 342 and second flexure component 344) may be shorter than the axial length of the spring components of the second plurality of flexure components (e.g., the first flexure component 352 and second flexure component 354).

FIG. 3D represents an example motion of the rotatable body 320 and scan element 390 of the scanner 3000 according to an example of the disclosure. For example, the spring components of the first flexure stage 340 and the second flexure stage 350 oscillate and become deformed while the one or more coils 372 are driven, thus causing the rotatable body 320 to rotate in a circumferential direction C1 (e.g., in either the clockwise or counterclockwise direction), as shown by first, second, and third positions RP1, RP2, and RP3. Correspondingly, as the spring components of the first flexure stage 340 and the second flexure stage 350 oscillate and the rotatable body 320 rotates, the scan element 390 may rotate in the circumferential direction C1 (e.g., in either the clockwise or counterclockwise direction), as shown by first, second, and third positions SP1, SP2, and SP3. As illustrated in FIG. 3D, in some implementations the scan element 390 and rotatable body 320 can rotate about the same axis of rotation A2, where the axis of rotation A2 is offset from or different from an axis A3 through which a center of mass of the scan element 390 passes.

As described herein, the scanner 3000 according to examples of the disclosure includes first and second flexure stages which have a high-deflection compound beam geometry. The scan element 390 is mounted in a manner to have collision-free high deflection angles. The configuration of the scanner 3000 including the rigid body 310 and rotatable body 320 further allows for installing drive and sense electronics in a compact manner while the spring components of the flexure components forming the first and second flexure stages may be formed of treated materials having a high deflection performance. For example, the spring components of the first flexure stage 340 and the second flexure stage 350 may be thin flat metal plates formed of steel, for example, stainless steel (e.g., precipitation stainless steel), and may include one or more interstitial additives (e.g., copper, aluminum, etc.) that enhance the durability and/or strength of the spring component. For example, the rigid body 310, the rotatable body 320, and the connection body 330 may be formed of stainless steel (e.g., 410 stainless steel having a magnetic martensitic structure).

FIG. 3E depicts a fifth view 3500 illustrating the scanner 3000 disposed in an example LIDAR system 3510, according to examples of the disclosure. The LIDAR system 3510 may be similar to the LIDAR system 200 of FIG. 2 and therefore an abbreviated description thereof will be provided for the sake of brevity. For example, the LIDAR system 3510 may include a transmit path 3520 which may include components similar to the TX path of FIG. 2, including a light source, modulator, transmitter, one or more first optical components 3540, scanner 3000, etc. The transmit path 3520 may emit light 3530 along a path and be reflected by one or more first optical components 3540 (e.g., one or more mirrors) and the scan element 390 of the scanner 3000 which can be rotated as described herein. The scan element 390 may reflect the light 3530 through a window 3580 of the LIDAR system 3510 toward an environment of the LIDAR system 3510 (or an environment of a vehicle including the LIDAR system 3510). In some implementations, the rigid body 310 of the scanner 3000 may be fixed to a portion or side of an enclosure 3590 of the LIDAR system 3510 so that the rigid body 310 remains fixed or stationary while the rotatable body 320 and scan element 390 rotate. The light 3530 may be reflected off of one or more objects in the environment back toward the LIDAR system 3510. The reflected light 3550 may be received through the window 3580 and be reflected by the scan element 390 of the scanner 3000 which can be rotated as described herein, and reflected by one or more second optical components 3560 (e.g., one or more mirrors) along the receive path 3570. For example, the receive path 3570 may include components similar to the RX path of FIG. 2, including the scanner 3000, one or more second optical components 3560, mixer, detector, DSP system, transimpedance amplifier, and ADCs, etc.

According to the example scanners described herein, a size of the scanner 3000 can have an overall smaller footprint for an equivalent size mirror (i.e., scan element 390) compared to scanners of previous LIDAR systems. For example, according to the configurations of the scanner 3000 described herein in which scan element 390 rotates about an axis A2 which is not coincident with the axis A3 through which the center of mass of the scan element 390 is provided, the deflection of the scan element 390 is not limited by obstructions such as a static structure, and can be deflected to the extent that the physical structure of the flexure components allows (e.g., based on material endurance and stress characteristics).

Further, the configuration of the scanner 3000 in which the scan element 390 rotates about the axis A2 which is offset from the center of mass of the scan element 390 further allows the scan element 390 to be positioned closer to the window 3580 of the LIDAR system 3510 through which light is transmitted and received. Further, the configuration of the scanner 3000 in which the scan element 390 rotates about the axis A2 which is offset from the center of mass of the scan element 390 allows for a smaller sized window compared to previous scanners, while being performant over a field of view of at least 120 degrees. Therefore, a vehicle implementing the LIDAR system 3510 as described herein can use less LIDARs overall to obtain full (360-degree) coverage compared to existing systems. In addition, the window 3580 may be formed with a flat or substantially flat shape unlike existing LIDAR systems which have cylindrically-shaped windows. The flat or substantially flat window 3580 can thus be maintained (cleaned)

more easily, can be heated, and can be integrated with other vehicle components (e.g., wipers) more easily compared to cylindrically-shaped windows. For example, a width of the window 3580 may be reduced about 50% in size relative to the width of windows of existing LIDAR systems.

Figure 4:
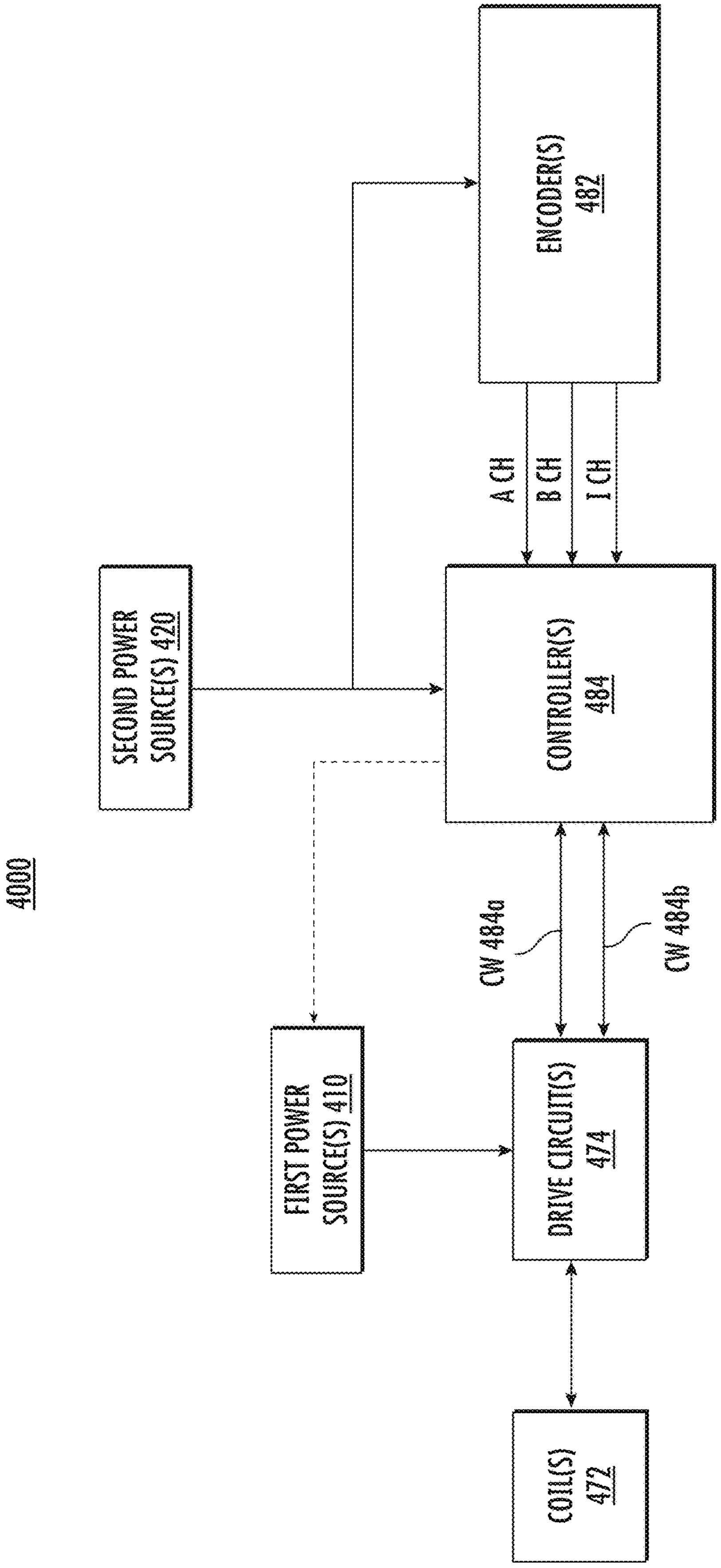
FIG. 4 depicts a block diagram of an example drive control system for a LIDAR system, according to some implementations of the disclosure.

FIG. 4 depicts a block diagram of a drive control system 4000 for a LIDAR system, according to some implementations of the present disclosure. Referring to FIG. 4, the drive control system 4000 includes one or more coils 472, one or more drive circuits 474, one or more encoders 482, one or more controllers 484, one or more first power sources 410, and one or more second power sources 420. The one or more coils 472 may correspond to the one or more coils 372. The one or more encoders 482 may correspond to the one or more encoders 382. The one or more second power sources 420 may be configured to supply power (e.g., with a voltage of about 3 volts to about 5 volts) to the one or more controllers 484 and the one or more encoders 482.

According to examples of the disclosure, the one or more controllers 484 may be configured to provide one or more control signals 484*a*, 484*b* to the one or more first power sources 410 and/or the one or more drive circuits 474 to drive the one or more coils 472. For example, the one or more control signals 484*a*, 484*b* can include a control signal which controls the one or more drive circuits 474 to cause current to flow through the one or more coils 472 in a first direction, thereby causing the rotatable body to rotate in a first direction (e.g., a clockwise direction). For example, the one or more control signals 484*a*, 484*b* can include another control signal which controls the one or more drive circuits 474 to cause current to flow through the one or more coils 472 in a second direction (opposite to the first direction), thereby causing the rotatable body to rotate in a second direction (e.g., a counterclockwise direction). When the one or more coils 472 are driven (e.g., when a current is applied to the one or more coils), the magnetic field generated by the one or more coils 472 interacts with the magnetic field of the one or more magnets (e.g., the one or more magnets 325) of the scanner, and a force (a torque) is exerted on the one or more magnets which are disposed at the rotatable body of the scanner. As described herein, the flexure components associated with the first flexure stage and the flexure components associated with the second flexure stage are configured to oscillate in response to the torque that is applied to the rotatable body. When the torque is exerted on the one or more magnets and the flexure components associated with the first flexure stage and the flexure components associated with the second flexure stage oscillate, the rotatable body rotates, which also causes the scan element coupled to the rotatable body to correspondingly rotate.

Referring still to FIG. 4, the one or more encoders 482 are configured to monitor or measure at least one of position information or direction information of the rotatable body (e.g., rotatable body 320). For example, the one or more encoders 482 can include one or more encoder readers (one or more detectors or sensors such as an optical sensor) which detect markings that are provided on a part (e.g., the encoder strip 329 such as a reflective adhesive strip) disposed on the rotatable body 320. In some implementations, the one or more encoders 482 are configured to determine the position information based on a number of pulses or square waves generated and/or by counting transitions in reflected light intensity from the reflective adhesive strip. In some implementations, the one or more encoders 482 may include a quadrature encoder having a plurality of encoder readers (detectors or sensors such as optical sensors) which output two signals (corresponding to an "A" channel and a "B" channel as depicted in FIG. 4), such as square waves. For example, the A channel and B channel may be 90 degrees out of phase. The one or more encoders 482 may be configured to determine a direction of rotation of the rotatable body based on an alternating pattern of the A channel and B channel. Further, in some implementations the one or more encoders 482 can include an index track (corresponding to a "I" channel as depicted in FIG. 4). The index track can be implemented to indicate a direction of rotation via an absolute state change (e.g., a 2-bit state change), and provide a reference point for absolute position information. The one or more encoders 482 may be configured to output one or more first signals indicating at least one of position information or direction information associated with the rotation of the rotatable body 320 when the one or more coils 472 are driven.

The drive control system 4000 may include the one or more first power sources 410 which are configured to supply power to the one or more drive circuits 474. In some implementations, the one or one or more controllers 484 are configured to control the one or more first power sources 410 to supply the power to drive the one or more coils 472 (via the one or more drive circuits 474), based on the one or more first signals output by the one or more encoders 482 and a second signal associated with an input associated with driving the one or more coils 472. The supply of power can be controlled by switching and/or regulating voltage and/or current to control at least one of timing, direction, and magnitude of the voltage and/or current applied to the one or more coils 472. In some implementations, the one or more drive circuits 474 may be embodied as one or more transistors, a half-bridge circuit, or a H-bridge circuit. The H-bridge circuit allows full bidirectional control of current through the one or more coils 472 (e.g., in a first rotational direction and a second rotational direction). In some implementations, the H-bridge circuit can include a snubber circuit (e.g., a triple snubber filter) to dampen voltage transients, suppress ringing or oscillations, improve switching performance, etc. In some implementations, the one or more drive circuits 474 can be configured to supply a voltage to the one or more coils 472 to cause displacement of the scan element of about 60 degrees (e.g., +/−30 degrees), the supplied voltage being about 10 volts, or more particularly about 7 volts. In some implementations, the one or more drive circuits 474 can be configured to supply power to the one or more coils 472 to cause displacement of the scan element of about 60 degrees (e.g., +/−30 degrees), the supplied power being less than 10 watts, or more particularly less than 5 watts. In some implementations, the one or more controllers 484 may be configured to control the one or more first power sources 410 to vary the power (e.g., by varying current and/or voltage) supplied to drive the one or more coils 472 via the one or more drive circuits 474 to vary a field of view of the scan element between about 0 degrees and about 150 degrees.

In some implementations the second signal can include current pulses through the one or more coils 472 in the form of two opposite-phase square wave signals to alternate a direction of current applied to the one or more coils 472. In some implementations, the second signal can include current pulses through the one or more coils 472 in the form of a sine wave signal having a first frequency which is generated using pulse-width modulation signal input to the H-bridge circuit having a second frequency (e.g., the first frequency being greater than the second frequency, for example, twice as large).

The one or more controllers 484 may be configured to adjust a control signal provided to the one or more drive circuits 474 based on a position of one or more of the flexure components of the first flexure stage and/or the second flexure stage as derived from the measurements obtained via the one or more encoders 482 and output as the one or more first signals. For example, the pulses associated with the one or more first signals may be centered with a natural oscillation frequency associated with the flexure components of the first flexure stage and/or the second flexure stage. When the pulses associated with the one or more first signals are not centered with the natural oscillation frequency associated with the flexure components of the first flexure stage and/or the second flexure stage, the one or more controllers 484 may be configured to adjust the control signal provided to the one or more drive circuits 474 so that the pulses are centered.

As described herein, the one or more first signals output by the one or more encoders 482 represents or is indicative of the movement (rotation) of the rotatable body which is coupled with the scan element. That is, the one or more first signals output by the one or more encoders 482 can be used by the one or more controllers 484 to reconstruct a waveform that corresponds to how the rotatable body rotates (e.g., a direction of rotation, position information, speed information, etc.). The one or more controllers 484 may be configured to compare a phase of the one or more first signals and/or reconstructed waveform relative to a phase of the second signal and the one or more controllers 484 may be configured to adjust an input provided to drive the one or more coils 472 based on the one or more first signals output by the one or more encoders 482 (or the reconstructed waveform) and the second signal so that the rotatable body (and correspondingly the scan element), oscillates at the resonant frequency of the flexure components of the first and/or second flexure stages. For example, the one or more controllers 484 may be configured to adjust an input which can include a phase difference between the one or more first signals or reconstructed waveform and the second signal. For example, the one or more controllers 484 may be configured to provide a control input to drive the one or more coils 472 such that the one or more first signals (or reconstructed waveform) are out of phase with the second signal by a predetermined amount (e.g., 90 degrees, 180 degrees, etc.), so that the rotatable body (and correspondingly the scan element), oscillates at the resonant frequency of the flexure components of the first and/or second flexure stages.

In some implementations, the one or more controllers 484 are configured to adjust one or more other inputs (e.g., a frequency associated with the second signal, an amount of power associated with the second signal, etc.), based on the one or more first signals (or the reconstructed waveform) and the second signal associated with driving the one or more coils 472. For example, the one or more controllers 484 may be configured to, based on differences between the one or more first signals output by the one or more encoders 482 and the second signal, adjust the amount of power so that pulses associated with the one or more first signals are centered with a natural oscillation frequency associated with the flexure components of the first and/or second flexure stages.

The disclosed driving controls for a scanner of a LIDAR system described herein are capable of varying a field-of-view of a scan element on-the-fly and consume low amounts of power (e.g., less than 5 watts). Further, the disclosed driving controls can ensure that the scan element oscillates at the resonant frequency of the flexure components of the first and/or second flexure stages based on information output by the one or more encoders 482 and potentially other feedback control loop mechanisms.

Figure 5:
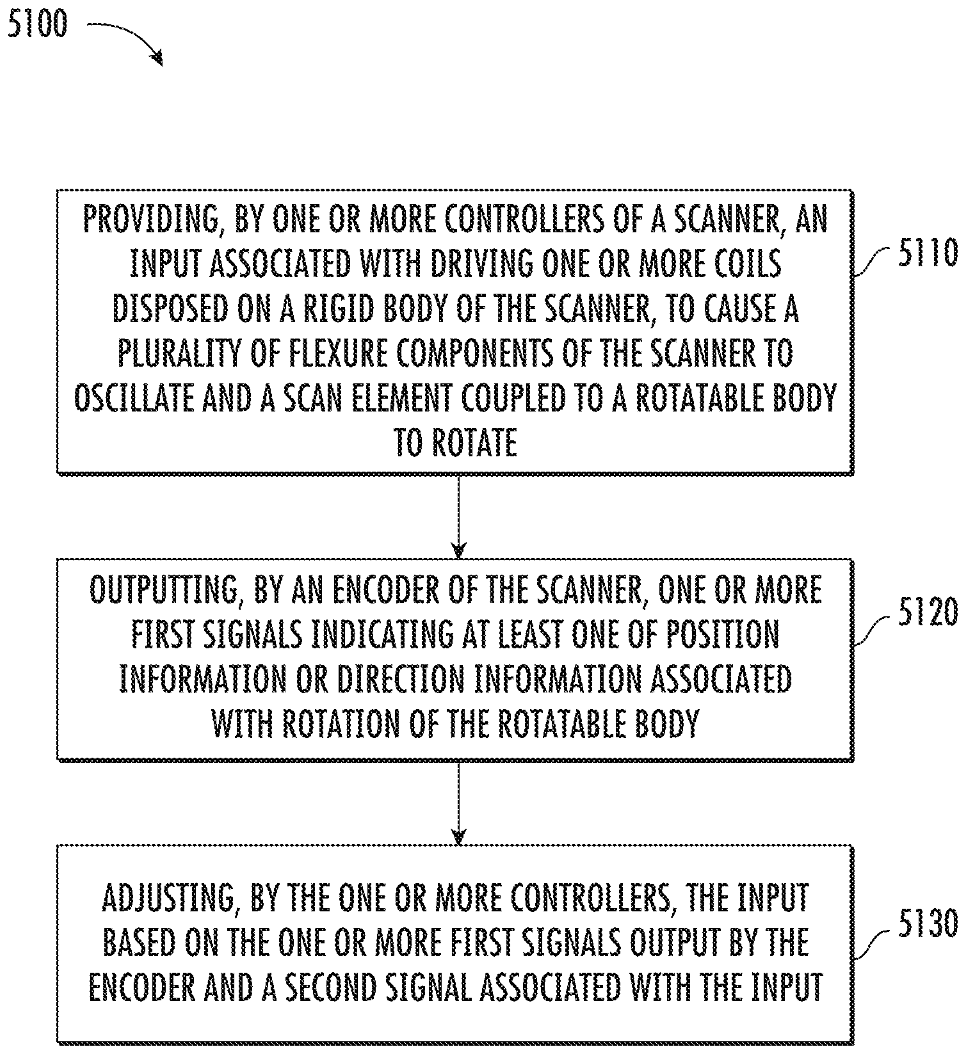
FIGS. 5-6 illustrate flow diagrams of example, non-limiting computer-implemented methods, according to some implementations of the disclosure.

FIG. 5 is a flow chart of a method 5100 for operating a scanner of a LIDAR system for a vehicle. Although shown in a particular sequence or order, unless otherwise specified, the order of the operations can be modified. Thus, the illustrated implementation should be understood only as an example, and the illustrated operations can be performed in a different order, and some operations can be performed in parallel. Additionally, one or more operations can be omitted in various implementations. Thus, not all operations are required in every embodiment. Other process flows are possible. The LIDAR system described in reference to FIG. 5 may correspond to the LIDAR system 200 of FIG. 2 and the LIDAR system may include the scanner 3000 of FIGS. 3A-3E and the drive control system 4000 of FIG. 4.

Referring to FIG. 5, at operation 5110, the method 5100 includes providing, by one or more controllers of a scanner, an input associated with driving one or more coils disposed on a rigid body (e.g., fixed base, fixed portion, etc.) of the scanner, to cause flexure components of the scanner to oscillate and a scan element coupled to a rotatable body (e.g., rotatable portion) to rotate. For example, the one or more controllers 484 of the scanner may be configured to provide an input associated with driving one or more coils 472. In some implementations, the one or more coils 472 may be disposed on the rigid body of the scanner (e.g., the rigid body 310). As described herein, when the one or more coils 472 are driven (e.g., via the one or more drive circuits 474), a force (torque) is exerted on the one or more magnets disposed on the rotatable body (e.g., the one or more magnets 325 disposed at the rotatable body 320), thereby causing flexure components of a first flexure stage (e.g., the first flexure stage 340) and/or a second flexure stage (e.g., the second flexure stage 350) to oscillate. The scan element is coupled to the rotatable body 320 and correspondingly rotates when the rotatable body 320 rotates.

At operation 5120, the method 5100 includes outputting, by an encoder of the scanner, one or more first signals indicating at least one of position information or direction information associated with rotation of the rotatable body. For example, as described with respect to FIG. 4, the one or more encoders 482 may be configured to output one or more first signals indicating at least one of position information or direction information associated with the rotation of the rotatable body when the one or more coils 472 are driven causing the rotation of the rotatable body (e.g., the rotatable body 320).

At operation 5130, the method 5100 includes adjusting, by the one or more controllers, the input based on the one or more first signals output by the encoder and a second signal associated with the input. For example, as described with respect to FIG. 4, the one or more controllers 484 may be configured to adjust the input based on the one or more first signals output by the one or more encoders 482 and a second signal associated with the input (e.g., a driving control signal associated with the one or more drive circuits 474).

In some implementations, the one or more controllers 484 may be configured to control one or more power sources (e.g., one or more first power sources 410) to supply power to drive the one or more coils 472, based on the one or more first signals output by the one or more encoders 482 and the second signal associated with the input. In some implementations, the amount of power may be about 10 watts. For example, the amount of power may be less than 5 watts (e.g., with a voltage of about 12 volts or in some implementations about 7 volts or less).

In some implementations, the input can include a frequency of the second signal. The one or more controllers 484 may be configured to adjust the frequency based on the one or more first signals output by the one or more encoders 482 and the second signal associated with the input.

In some implementations, the input can include a phase of the second signal. The one or more controllers 484 may be configured to compare a phase of the one or more first signals and/or a reconstructed waveform with a phase of the second signal associated with driving the one or more coils 472, and the one or more controllers 484 may be configured to adjust the input (e.g., the phase) associated with driving the one or more coils 472 based on the comparison so that the rotatable body (and correspondingly the scan element), oscillates at the resonant frequency of the flexure components.

In some implementations, the one or more controllers 484 are configured to adjust one or more other inputs (e.g., a frequency associated with the second signal, an amount of power associated with the second signal, etc.), based on differences between the one or more first signals (or the reconstructed waveform) and the second signal. For example, the input corresponds to an amount of power and the one or more controllers 484 may be configured to, based on differences between the one or more first signals output by the encoder 482 and the second signal, adjust the amount of power so that pulses associated with the second signal are centered with a natural oscillation frequency associated with the flexure components.

Figure 6:
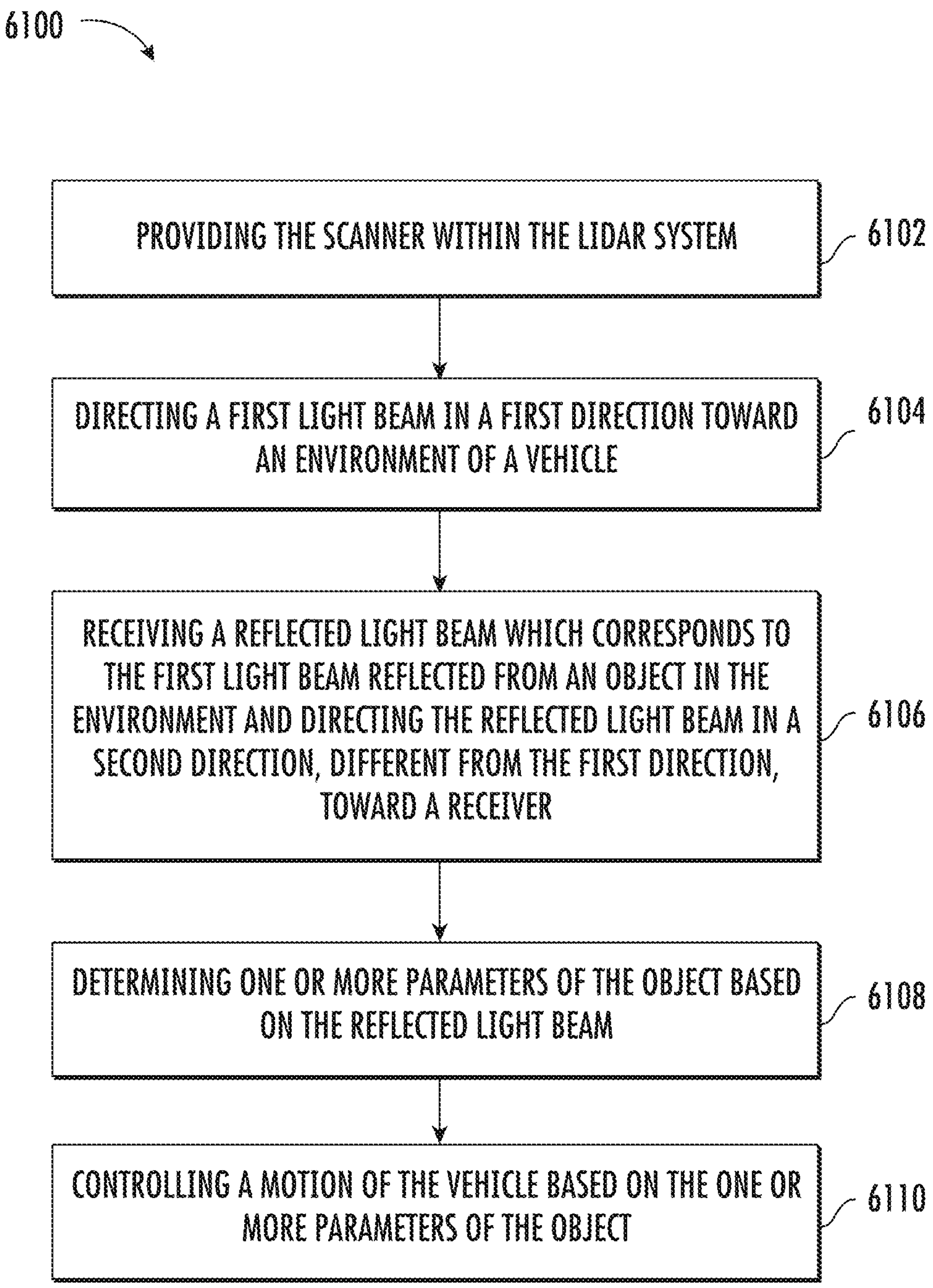

FIG. 6 is a flow chart of an example, non-limiting computer-implemented method 6100 for controlling a vehicle. Although shown in a particular sequence or order, unless otherwise specified, the order of the operations can be modified. Thus, the illustrated implementation should be understood only as an example, and the illustrated operations can be performed in a different order, and some operations can be performed in parallel. Additionally, one or more operations can be omitted in various implementations. Thus, not all operations are required in every implementation. Other process flows are possible.

The method 6100 may include aspects of the method of FIG. 5. However, in some implementations the method 6100 may be an independent method. Referring to FIG. 6, at operation 6102, the method 6100 includes providing a scanner according to the examples described herein (e.g., scanner 3000) within the LIDAR system.

At operation 6104, the method 6100 includes directing a first light beam (e.g., via the scanner) in a first direction toward an environment of the vehicle. For example, the first light beam may correspond to outgoing light transmitted via the transmitter 220 in FIG. 2 to the object 218. For example, the scanner may be configured to rotate according to the examples described herein (e.g., with respect to FIGS. 3A-5) while directing the first light beam toward the environment.

At operation 6106, the method 6100 includes receiving a reflected light beam which corresponds to the first light beam reflected from the object in the environment and directing the reflected light beam in a second direction, different from the first direction, toward a receiver (e.g., receiver 222 in FIG. 2). For example, the reflected light beam may correspond to incoming light which has been reflected off object 218 which may be in an environment of the vehicle. Further, the incoming light may be directed toward receiver 222 in FIG. 2.

At operation 6108, the method 6100 includes determining one or more parameters of the object based on the reflected light beam. For example, as described herein, one or more of the parameters of the object (e.g., object 218) can be determined based on sensor data collected by the LIDAR system. For example, the LIDAR system may output sensor data 104 which can be processed by one or more sub-control system(s) 101 shown in FIG. 1 to determine the parameters of the object. For example, the parameters of the object can include map or location data associated with the object, distance information associated with the object, identification or classification information associated with the object, motion information associated with the object, etc.

At operation 6110, the method 6100 includes controlling a motion of the vehicle based on the one or more parameters of the object. For example, as described herein, one or more of the sub-control system(s) 101 shown in FIG. 1 can be implemented to control a motion of the vehicle based on the one or more parameters of the object (e.g., by generating a motion plan, by selecting a motion plan, by controlling braking, acceleration, and/or steering components of the vehicle, etc.).

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the disclosure is by way of example rather than by way of limitation, and the subject disclosure does not preclude inclusion of such modifications, variations or additions to the disclosure as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of", "any combination of" example elements listed therein, etc. Terms such as "based on" should be understood as "based at least in part on."

Terms used herein are used to describe the example embodiments and are not intended to limit and/or restrict the disclosure. The singular forms "a," "an" and "the" are intended to include the plural forms as well, unless the context clearly indicates otherwise. In this disclosure, terms such as "including", "having", "comprising", and the like are used to specify features, numbers, steps, operations, elements, components, or combinations thereof, but do not preclude the presence or addition of one or more of the features, numbers, steps, operations, elements, components, or combinations thereof.

The term "and/or" includes a combination of a plurality of related listed items or any item of the plurality of related listed items. For example, the scope of the expression or phrase "A and/or B" includes the item "A", the item "B", and the combination of items "A and B".

In addition, the scope of the expression or phrase "at least one of A or B" is intended to include all of the following: (1) at least one of A, (2) at least one of B, and (3) at least one of A and at least one of B. Likewise, the scope of the expression or phrase "at least one of A, B, or C" is intended to include all of the following: (1) at least one of A, (2) at least one of B, (3) at least one of C, (4) at least one of A and at least one of B, (5) at least one of A and at least one of C, (6) at least one of B and at least one of C, and (7) at least one of A, at least one of B, and at least one of C.

It will be understood that, although the terms first, second, third, etc., may be used herein to describe various elements, the elements are not limited by these terms. Instead, these terms are used to distinguish one element from another element. For example, without departing from the scope of the disclosure, a first element may be termed as a second element, and a second element may be termed as a first element.

The terms "coupled," "fixed," "attached to," and the like refer to both direct coupling, fixing, or attaching, as well as indirect coupling, fixing, or attaching through one or more intermediate components or features, unless otherwise specified herein.

The term "can" should be understood as referring to a possibility of a feature in various implementations and not as prescribing an ability that is necessarily present in every implementation. For example, the phrase "X can perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the disclosure.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

Aspects of the above-described example embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks, Blu-Ray disks, and DVDs; magneto-optical media such as optical discs; and other hardware devices that are specially configured to store and perform program instructions, such as semiconductor memory, read-only memory (ROM), random access memory (RAM), flash memory, USB memory, and the like. Examples of program instructions include both machine code, such as produced by a compiler, and files containing higher level code that may be executed by the computer using an interpreter. The program instructions may be executed by one or more processors. The described hardware devices may be configured to act as one or more software modules in order to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the non-transitory computer-readable storage media may also be embodied in at least one application specific integrated circuit (ASIC) or Field Programmable Gate Array (FPGA).

Each block of the flowchart illustrations may represent a unit, module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently (simultaneously) or the blocks may sometimes be executed in the reverse order, depending upon the functionality involved.

The foregoing describes the technology of this disclosure within the context of a LIDAR system and an autonomous vehicle for example purposes only. As described herein, the technology described herein is not limited to a LIDAR system or an autonomous vehicle and can be implemented for or within other systems, autonomous platforms, and other computing systems.

What is claimed is:

1. A light detection and ranging (LIDAR) system for a vehicle, the LIDAR system comprising:
- a light source configured to emit light; and
- a scanner configured to direct the light to an environment of the vehicle, the scanner including:
  - a rigid body comprising one or more drive coils,
  - a rotatable body comprising one or more magnets, the rotatable body connected to the rigid body via a connection body and a first flexure stage and a second flexure stage, wherein the first flexure stage and the second flexure stage are configured to oscillate in response to a force exerted on the one or more magnets when the one or more drive coils are driven, thereby causing the rotatable body to rotate, and
  - a scan element configured to rotate via rotation of the rotatable body and to direct the light emitted by the light source to the environment of the vehicle.

2. The LIDAR system of claim 1, further comprising:
- one or more power sources; and
- one or more controllers configured to control the one or more power sources to supply power to the one or more drive coils to drive the one or more drive coils which causes the force to be exerted on the one or more magnets, thereby causing flexure components of the first flexure stage and the second flexure stage to oscillate.

3. The LIDAR system of claim 1, wherein the one or more drive coils are wound about an axis which is transverse to an axis of rotation of the scan element.

4. The LIDAR system of claim 1, wherein the second flexure stage is coupled to the rotatable body and the connection body.

5. The LIDAR system of claim 4, wherein the first flexure stage is coupled to the rigid body and the connection body.

6. The LIDAR system of claim 1, wherein at least a portion of the first flexure stage and at least a portion of the second flexure stage lie in a same plane, the same plane being parallel to an axis of rotation of the scan element.

7. The LIDAR system of claim 6, wherein
the first flexure stage comprises a first flexure component comprising a first spring component and a second spring component and a second flexure component comprising a third spring component and a fourth spring component,
the first spring component and the second spring component lie in a first plane and the third spring component and the fourth spring component lie in a second plane.

8. The LIDAR system of claim 7, wherein
the second flexure stage comprises a first flexure component and a second flexure component,
the first flexure component of the second flexure stage is disposed between the first spring component and the second spring component of the first flexure stage in the first plane, and
the second flexure component of the second flexure stage is disposed between the third spring component and the fourth spring component of the first flexure stage in the second plane.

9. The LIDAR system of claim 7, wherein the first spring component and the second spring component are spaced apart in an axial direction of the rotatable body.

10. The LIDAR system of claim 1, wherein the first flexure stage and the second flexure stage are formed of steel plates.

11. The LIDAR system of claim 1, wherein
the first flexure stage comprises a first flexure component and a second flexure component each having a radial length which extends in a radial direction of the rotatable body from the rigid body to the connection body and are spaced apart from each other in a circumferential direction of the rotatable body,
the first flexure component includes a first plurality of spring components spaced apart from each other in an axial direction of the rotatable body, and
the second flexure component includes a second plurality of spring components spaced apart from each other in the axial direction of the rotatable body.

12. The LIDAR system of claim 1, wherein the scan element is coupled to the rotatable body.

13. The LIDAR system of claim 12, wherein an axis of rotation of the scan element is offset from a center of mass of the scan element.

14. The LIDAR system of claim 1, wherein the scanner further includes an encoder configured to measure at least one of a position of the rotatable body and a direction of movement of the rotatable body, the encoder being disposed between the rotatable body and the rigid body.

15. The LIDAR system of claim 1, wherein the scan element is a mirror configured to be displaced according to a magnitude of a supply of current supplied to drive the one or more drive coils to provide a variable field of view for the LIDAR system.

16. The LIDAR system of claim 15, further comprising one or more controllers configured to control the supply of current supplied to drive the one or more drive coils such that the scan element is displaceable between about 45 degrees and about 75 degrees.

17. The LIDAR system of claim 15, wherein the variable field of view is adjustable between about 0 degrees and about 120 degrees.

18. The LIDAR system of claim 1, wherein the one or more drive coils and the one or more magnets are disposed in a space between the rotatable body and the rigid body, and are spaced apart from the first flexure stage in a circumferential direction of the rotatable body.

19. An autonomous vehicle (AV) control system for a vehicle, comprising:
one or more processors; and
a light detection and ranging (LIDAR) system comprising:
a light source configured to emit light; and
a scanner configured to direct the light to an environment of the vehicle, the scanner including:
a rigid body comprising one or more drive coils,
a rotatable body comprising one or more magnets, the rotatable body connected to the rigid body via a connection body and a first flexure stage and a second flexure stage, wherein the first flexure stage and the second flexure stage are configured to oscillate in response to a force exerted on the one or more magnets when the one or more drive coils are driven, thereby causing the rotatable body to rotate, and
a scan element configured to rotate via rotation of the rotatable body and to direct the light emitted by the light source to the environment of the vehicle.

20. An autonomous vehicle, comprising:
an autonomous vehicle control system, the autonomous vehicle control system comprising one or more processors and a light detection and ranging (LIDAR) system, the LIDAR system comprising:
a light source configured to emit light; and
a scanner configured to direct the light to an environment of the autonomous vehicle, the scanner including:
a rigid body comprising one or more drive coils,
a rotatable body comprising one or more magnets, the rotatable body connected to the rigid body via a connection body and a first flexure stage and a second flexure stage, wherein the first flexure stage and the second flexure stage are configured to oscillate in response to a force exerted on the one or more magnets when the one or more drive coils are driven, thereby causing the rotatable body to rotate, and
a scan element configured to rotate via rotation of the rotatable body and to direct the light emitted by the light source to the environment of the autonomous vehicle.

* * * * *